(12) United States Patent
Fujio

(10) Patent No.: US 9,725,245 B2
(45) Date of Patent: Aug. 8, 2017

(54) TRANSPORT CONVEYOR AND TRANSPORT UNIT

(71) Applicant: Daifuku Co., Ltd., Osaka-shi (JP)

(72) Inventor: Yoshihiko Fujio, Hinocho (JP)

(73) Assignee: Daifuku Co., Ltd., Osaka-shi (JP)

( * ) Notice: Subject to any disclaimer, the term of this patent is extended or adjusted under 35 U.S.C. 154(b) by 0 days.

(21) Appl. No.: 15/129,994

(22) PCT Filed: Mar. 28, 2014

(86) PCT No.: PCT/JP2014/059191
§ 371 (c)(1),
(2) Date: Sep. 28, 2016

(87) PCT Pub. No.: WO2015/145739
PCT Pub. Date: Oct. 1, 2015

(65) Prior Publication Data
US 2017/0144840 A1    May 25, 2017

(51) Int. Cl.
*B65G 15/60* (2006.01)
*B65G 21/14* (2006.01)
(Continued)

(52) U.S. Cl.
CPC ............. *B65G 21/14* (2013.01); *B65G 15/00* (2013.01); *B65G 15/60* (2013.01); *B65G 41/002* (2013.01); *B65G 47/648* (2013.01)

(58) Field of Classification Search
CPC ...... B65G 21/14; B65G 15/00; B65G 41/002; B65G 47/648; B65G 15/60
(Continued)

(56) References Cited

U.S. PATENT DOCUMENTS

| 4,633,996 A | * | 1/1987 | Waterhouse | B65G 15/60 198/370.1 |
| 5,083,657 A | * | 1/1992 | Kelsey | B65G 15/60 198/811 |

(Continued)

FOREIGN PATENT DOCUMENTS

| JP | 2108929 U | 8/1990 |
| JP | 85143 Y2 | 2/1996 |
| JP | 200929620 A | 2/2009 |

*Primary Examiner* — Mark A Deuble
(74) *Attorney, Agent, or Firm* — The Webb Law Firm

(57) ABSTRACT

A transport conveyor and a transport unit including such a transport conveyor are provided in which the transport conveyor can be made compact in the lateral direction while being compatible with a downstream conveyor whose transport direction is different from that of the transport conveyor. A second transport winding member (9), a first relaying winding member (10), and a second relaying winding member are supported to be swingable about a vertical axis (X1) extending along the vertical direction and located on the other side end portion, along a transport direction, of the transport conveyor (5). An operatively connecting mechanism is provided for causing the second transport winding member (9), the first relaying winding member (10), and the second relaying winding member to swing in an operatively connected manner, to cause the second transport winding member (9) and the second relaying winding member to swing integrally about a vertical axis (X1) and to cause the first relaying winding member (10) to swing about the vertical axis (X1) in the direction in which the second transport winding member (9) and the second relaying winding member swing and by an amount of swing that is greater than the amount of swing of the second transport winding member (9) and the second relaying winding member.

8 Claims, 11 Drawing Sheets

(51) Int. Cl.
  *B65G 15/00* (2006.01)
  *B65G 41/00* (2006.01)
  *B65G 47/64* (2006.01)
(58) Field of Classification Search
  USPC ......................................................... 198/839
  See application file for complete search history.

(56) References Cited

U.S. PATENT DOCUMENTS

| | | | |
|---|---|---|---|
| 5,743,379 A * | 4/1998 | Warnecke | B65G 15/60 198/839 |
| 8,016,101 B2 | 9/2011 | Hishinuma | |
| 2002/0121423 A1 * | 9/2002 | Warnecke | B65G 15/60 198/370.1 |
| 2005/0205392 A1 * | 9/2005 | Hishinuma | B65G 15/60 198/839 |
| 2007/0131524 A1 * | 6/2007 | Buxton | B65G 47/52 198/839 |
| 2011/0315523 A1 * | 12/2011 | Lim | B65G 15/60 198/835 |

\* cited by examiner

Fig. 14
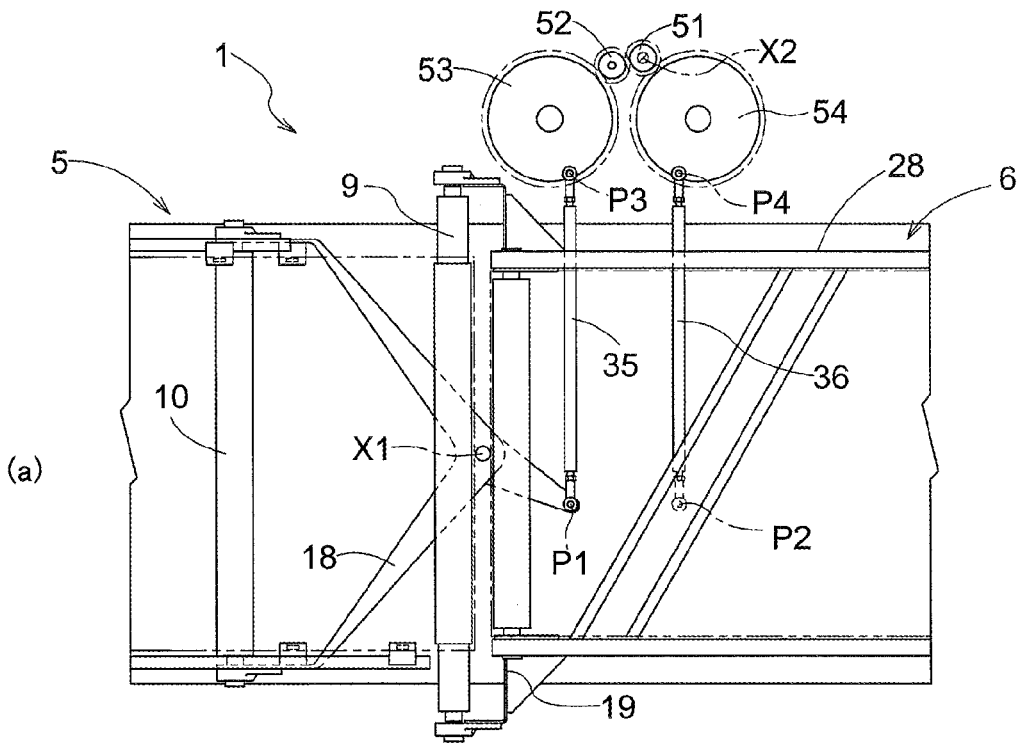
(a)
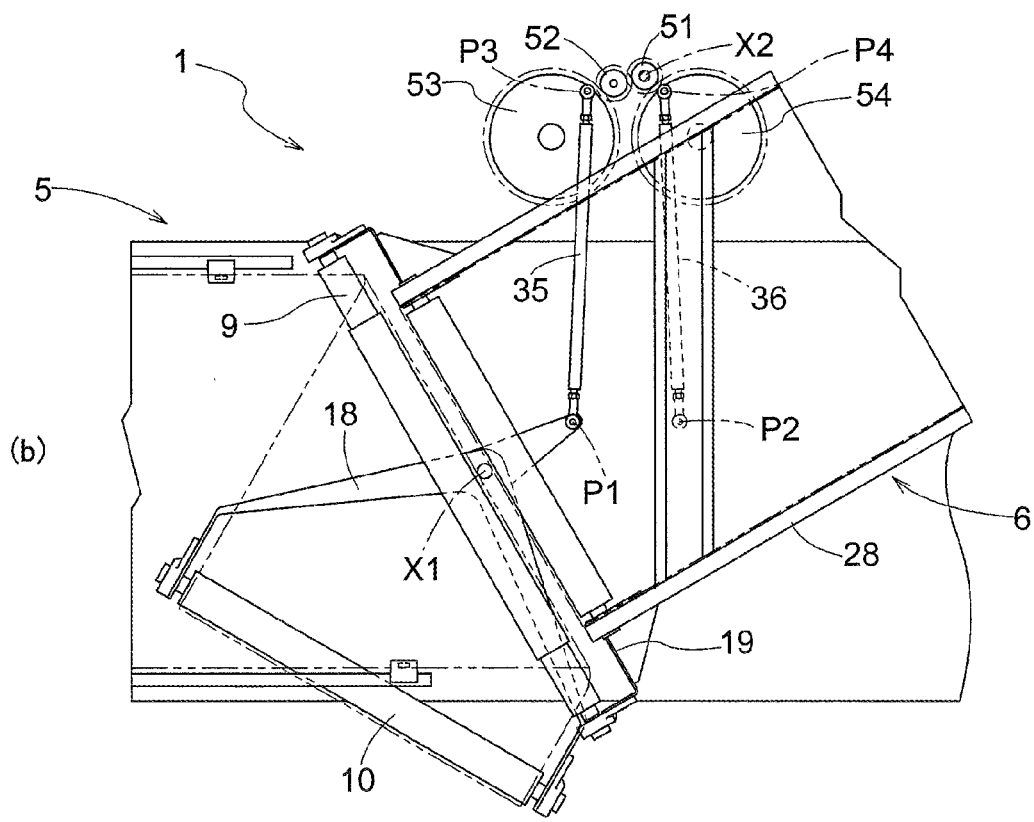
(b)

TRANSPORT CONVEYOR AND TRANSPORT UNIT

CROSS-REFERENCE TO RELATED APPLICATION

This application is the United States national phase of International Application No. PCT/JP2014/059191 filed Mar. 28, 2014, the disclosure of which is hereby incorporated in its entirety by reference.

TECHNICAL FIELD

The present invention relates to a transport conveyor and a transport unit having such transport conveyor which comprises an endless belt wound over a plurality of winding members and a driving rotatable member, a transport actuator device for drivingly rotating the driving rotatable member, wherein the transport conveyor transports an article placed on an upward-facing transporting surface of the endless belt along a transport direction, as a result of a fact that the driving rotatable member is drivingly rotated by the transport actuator device to move the endless belt along a longitudinal direction thereof.

DESCRIPTION OF RELATED ART

A transport conveyor, such as one described above, is provided on an upstream side, in the transport direction, of a downstream conveyor located downstream in a transport direction, and is used when transporting articles in order to transfer articles transported by the transport conveyor to the downstream conveyor. And the downstream conveyor may be provided such that its transport direction is different from the transport direction of the transport conveyor. There is a transport conveyor that is arranged to be compatible with a downstream conveyor even when the transport direction of the downstream conveyor is different from the transport direction of the transport conveyor (see, for example, FIGS. 1 and 2 of Patent Document 1).

Incidentally, a main stream conveyor 12 and a branching side conveyor 13 are provided as downstream conveyors in Patent Document 1, and the transport directions of the main stream conveyor 12 and the branching side conveyor 13 are different from each other by 30 degrees. And the transport conveyor (belt junction conveyor 10) described in Patent Document 1 is configured to be capable of being switched between a first transporting state for transferring articles to the main stream conveyor 12 and a second transporting state for transferring articles to the branching side conveyor 13, so as to be able to transport articles properly to both the main stream conveyor 12 and the branching side conveyor 13 whose transport directions are different from each other.

To describe the switching between the first transporting state and the second transporting state of the transport conveyor of Patent Document 1, the transport conveyor described in Patent Document 1 includes, as a plurality of winding members, a first transport winding member located in an end portion on a first direction side which is one direction along the transport direction of the transport portion that forms a transporting surface of an endless belt, a second transport winding member located in an end portion on a second direction side which is the other direction along the transport direction of the transport portion, a first relaying winding member which is located below the first transport winding member and the second transport winding member and which is located between the first transport winding member and the second transport winding member along the transport direction, and a second relaying winding member which is located below the first transport winding member and the second transport winding member and which is located on the second direction side of the first relaying winding member along the transport direction. The first transport winding member and the first relaying winding member are supported to be swingable about a vertical axis that extends along a vertical direction and is located in the end portion on the second direction side.

And a transport conveyor is configured to be provided such that the downstream conveyors are located on the first direction side, and is configured to be switched from the first transporting state to the second transporting state by swinging the first transport winding member clockwise about the vertical axis by 30 degrees, and by absorbing the extension and contraction of the transport portion of the endless belt that resulted from the swinging of the first transport winding member by swinging the first relaying winding transport winding member counterclockwise about the vertical axis by 30 degrees.

PRIOR ART DOCUMENTS

Patent Documents

Patent Document 1: JP Publication of Application No. 2009-029620

SUMMARY OF THE INVENTION

Problems to be Solved by the Invention

In the transport conveyor described in Patent Document 1, the first transport winding member located in the end portion on the first direction side is swung about the vertical axis located in the end portion on the second direction side; thus, the radius of the swinging movement of the first transport winding member is large and thus, the amount of movement in a lateral direction of the first transport winding member is large when swinging the first transport winding member by a set angle. Thus, a large space in the lateral direction was required to allow the first transport winding member to swing about the vertical axis.

Accordingly, a transport conveyor and a transport unit including such a transport conveyor are desired in which the transport conveyor can be made compact in the lateral direction while being compatible with a downstream conveyor even when the transport direction of the downstream conveyor is different from that of the transport conveyor.

Means for Solving the Problems

A transport conveyor in accordance with the present invention comprises: an endless belt wound over a plurality of winding members and a driving rotatable member; a transport actuator device for drivingly rotating the driving rotatable member; wherein the transport conveyor transports an article placed on an upward-facing transporting surface of the endless belt along a transport direction, as a result of a fact that the driving rotatable member is drivingly rotated by the transport actuator device to move the endless belt along a longitudinal direction thereof.

And provided as the plurality of winding members are: a first transport winding member located in an end portion, on a first direction side which is one side along the transport direction, of a transport portion that forms the transporting surface of the endless belt; a second transport winding member located in an end portion, on a second direction side which is the other side along the transport direction, of the transport portion; a first relaying winding member which is located at a lower position than the first transport winding member and the second transport winding member and which is located between the first transport winding member and the second transport winding member along the transport direction; a second relaying winding member which is located at a lower position than the first transport winding member and the second transport winding member and which is located on the second direction side of the first relaying winding member along the transport direction; wherein the endless belt is wound over the first transport winding member, the second transport winding member, the first relaying winding member, the second relaying winding member, and the first transport winding member, in that order, wherein the second transport winding member, the first relaying winding member, and the second relaying winding member are supported to be swingable about a vertical axis extending along a vertical direction and located in an end portion, on the second direction side, of the transport conveyor, wherein an operatively connecting mechanism is provided to cause the second transport winding member, the first relaying winding member, and the second relaying winding member to swing in an operatively connected manner to cause the second transport winding member and the second relaying winding member to swing integrally about the vertical axis and to cause the first relaying winding member to swing about the vertical axis in the direction in which the second transport winding member and the second relaying winding member swing, and by an amount of swing that is greater than an amount of swing of the second transport winding member and the second relaying winding member.

That is, the second transport winding member, the first relaying winding member, and the second relaying winding member are supported to be swingable about the vertical axis extending along the vertical direction and located in an end portion on the second direction side. And the operatively connecting mechanism which causes these second transport winding members, the first relaying winding member, and the second relaying winding member to swing in an operatively connected manner is configured to cause the second transport winding member and the second relaying winding member to swing integrally about the vertical axis and to cause the first relaying winding member to swing about the vertical axis in the direction in which the second transport winding member and the second relaying winding member swing, and by an amount of swing that is greater than an amount of swing of the second transport winding member and the second relaying winding member.

In other words, the shape of the end portion, on the second direction side, of the transport portion of the endless belt can be changed by causing the second transport winding member to swing about the vertical axis. Thus, when a downstream conveyor is placed downstream of, and adjacent to, the transport conveyor, the shape of the transport portion can be made to be compatible with the transport direction of the downstream conveyor placed downstream of and adjacent to it, which makes it difficult for a gap to form between the transport conveyor and the downstream conveyor, and which makes it easier for the article to be transferred from the transport conveyor to the downstream conveyor.

In addition, by causing the first relaying winding member to swing about the vertical axis in the direction in which the second transport winding member and the second relaying winding member swing, and by an amount of swing that is greater than that of the second transport winding member and the second relaying winding member by a desired amount, the extension and contraction of the transport portion of the endless belt, that resulted from causing the second transport winding member and the second relaying winding member to swing about the vertical axis, can be absorbed, so that the amount of change in the winding path length at each position along a belt width direction can be reduced. Particularly, the amount of change in the winding path length at each position along a belt width direction can be properly reduced by setting the amount of swing of the first relaying winding member to be twice the amount of swing of the second transport winding member and the second relaying winding member.

And because the second transport winding member is located in the end portion, on the second direction side, of the transport portion of the endless belt and the vertical axis is located in the end portion, on the second direction side, of the transport conveyor, the swing radius of the second transport winding member is shorter than when the vertical axis is located in an end portion, on the first direction side, of the transport conveyor. Thus, the amount of movement of the second transport winding member, when the second transport winding member is caused to swing by a set angle, becomes smaller in the lateral direction of the transport conveyor; thus, the swinging of the second transport winding member about the vertical axis can be performed in a small space.

As such, it became possible to provide a transport conveyor that can be made compact in the lateral direction while being compatible with a downstream conveyor even when the transport direction of the downstream conveyor is different from that of the transport conveyor.

Examples of preferred embodiments of the transport conveyor in accordance with the present invention are described next.

In an embodiment of the transport conveyor in accordance with the present invention, each of the first transport winding member, the second transport winding member, the first relaying winding member, and the second relaying winding member is preferably provided to be rotatable about a horizontal axis as the endless belt moves along a longitudinal direction thereof.

That is, each of the first transport winding member, the second transport winding member, the first relaying winding member, and the second relaying winding member rotates about a horizontal axis as the endless belt moves along its longitudinal direction. This makes it difficult for robbing to take place between the endless belt and each of the first transport winding member, the second transport winding member, the first relaying winding member, and the second relaying winding member; thus reducing any generation of heat while improving durability of the transport conveyor.

In an embodiment of the transport conveyor in accordance with the present invention, there are preferably provided: a first support frame which supports the first relaying winding member and is swingable about the vertical axis; a second support frame which supports the second transport winding member and the second relaying winding member and is swingable about the vertical axis; and a base frame which supports the first transport winding member and is fixed with respect to movement about the vertical axis, wherein the driving rotatable member and the transport actuator device are preferably supported by the base frame.

That is, when causing the second transport winding member, the first relaying winding member, and the second relaying winding member to swing about the vertical axis, it is necessary only to cause the first support frame and the second support frame which support these winding members to swing about the vertical axis with respect to the base frame, while the base frame which supports the driving rotatable member and the transport actuator device do not swing. Thus, it is not necessary to provide the electricity supply line for supplying electricity to the transport actuator device so as to be swingable about the vertical axis, which makes it easier to provide the transport actuator device.

In an embodiment of the transport conveyor in accordance with the present invention, the operatively connecting mechanism preferably includes a first operatively connecting member which operatively connects the first relaying winding member to a swing actuator device, and a second operatively connecting member which operatively connects the second transport winding member and the second relaying winding member to the swing actuator device, wherein the operatively connecting mechanism is preferably configured to cause the first operatively connecting member and the second operatively connecting member to be moved by an actuating force of the swing actuator device to cause the first relaying winding member, the second transport winding member, and the second relaying winding member to swing, in an operatively connected manner.

That is, the first operatively connecting member and the second operatively connecting member can be caused be moved by an actuating force of the swing actuator device to cause the first relaying winding member, the second transport winding member, and the second relaying winding member to swing, in an operatively connected manner. In other words, it is necessary only to provide one actuator device in order to move the first operatively connecting member and the second operatively connecting member. Thus, the number of actuator device can be reduced compared with the case in which an actuator device for actuating the first operatively connecting member and an actuator device for actuating the second operatively connecting member are provided separately. This also makes it easier to actuate, in synchronization, the first operatively connecting member and the second operatively connecting member.

A transport unit in accordance with the present invention is a transport unit provided with one of the transport conveyor described above, and in which an adjacent conveyor located on the second direction side of, and adjacent to, the transport conveyor is provided wherein the operatively connecting mechanism is configured to cause the adjacent conveyor, the second transport winding member, and the second relaying winding member to swing, in an operatively connected manner, to cause the adjacent conveyor, the second transport winding member, and the second relaying winding member to swing integrally about the vertical axis.

That is, as the second transport winding member and the second relaying winding member swing about the vertical axis and the angle of the end portion, on the second direction side, of the transport conveyor changes, the adjacent conveyor swings by the same angle as that angle, thus, making it difficult for a gap to form between the transport conveyor and the adjacent conveyor, and making it easier for the article to be transferred from the transport conveyor to the adjacent conveyor.

And because the adjacent conveyor swings about the vertical axis, when a plurality, or pair of, downstream conveyors are provided so as to be located next to each other in the lateral direction and on the second direction side of the adjacent conveyor (on the side opposite from the transport conveyor with respect to the transport direction), for example, the article can be transferred to each of the pair of downstream conveyors.

In addition, the adjacent conveyor does not need to be a specially constructed conveyor in which some of the winding members of the plurality of winding members are swung as in the case of the transport conveyor, thus, does not need to have things that are equivalent to the first relaying winding member and second relaying winding member of the transport conveyor. This makes it easier to make the vertical width of the adjacent conveyor more compact, and to make the adjacent conveyor lighter in weight, than the transport conveyor. In addition, by making the vertical width of the adjacent conveyor more compact than the transport conveyor, the operatively connecting mechanism can be located under the adjacent conveyor, which makes it possible to make the entire transport unit more compact in size in plan view. Furthermore, the directions of the rotations about the vertical axis of the second transport winding member, the first relaying winding member, the second relaying winding member, and the adjacent conveyor are all identical, which facilitates in an effort to simplify the structure for swinging these members.

Examples of preferred embodiments of the transport unit of the present invention are described next.

In an embodiment of the transport unit in accordance with the present invention, the adjacent conveyor is preferably provided to be swingable about the vertical axis, wherein the operatively connecting mechanism preferably includes a first operatively connecting member which operatively connects the first relaying winding member to a swing actuator device, and a second operatively connecting member which operatively connects the second transport winding member and the second relaying winding member to the swing actuator device, a third operatively connecting member which operatively connects the adjacent conveyor to the swing actuator device, wherein the operatively connecting mechanism is preferably configured to cause the first operatively connecting member, the second operatively connecting member, and the third operatively connecting member to be moved by an actuating force of the swing actuator device, to cause the first relaying winding member, the second transport winding member, the second relaying winding member, and the adjacent conveyor to swing, in an operatively connected manner.

That is, the first operatively connecting member, the second operatively connecting member, and the third operatively connecting member can be caused to be moved by an actuating force of the swing actuator device to cause the first relaying winding member, the second transport winding member, the second relaying winding member, and the adjacent conveyor to swing, in an operatively connected manner. In other words, it is necessary only to provide one actuator device in order to move the first operatively connecting member, the second operatively connecting member and the third operatively connecting member. Thus, the number of actuator device can be reduced compared with the case in which an actuator device for actuating the first operatively connecting member, an actuator device for actuating the second operatively connecting member and an actuator device for actuating the third operatively connecting member are provided separately. This also makes it easier to actuate, in synchronization, the first operatively connecting member, the second operatively connecting member, and the third operatively connecting member.

In an embodiment of the transport unit in accordance with the present invention, the second transport winding member and the second relaying winding member are preferably attached to the adjacent conveyor for swinging integrally with the adjacent conveyor about the vertical axis, wherein the second operatively connecting member is preferably formed by the third operatively connecting member and the adjacent conveyor, and wherein the first operatively connecting member and the third operatively connecting member are preferably provided at lower positions than the adjacent conveyor.

That is, since the second operatively connecting member is formed by the third operatively connecting member and the adjacent conveyor, it is not necessary to provide separately an operatively connecting member for causing the second transport winding member and the second relaying winding member to swing about the vertical axis, thus facilitating the simplification of the structure of the operatively connecting mechanism.

In addition, by providing the first operatively connecting member and the third operatively connecting member utilizing the space below the adjacent conveyor whose vertical width is made compact, the transport unit can be made compact in plan view compared with the case in which these first operatively connecting member and the third operatively connecting member are located to a lateral side location of the transport conveyor or of the adjacent conveyor.

In an embodiment of the transport unit in accordance with the present invention, a first support frame which supports the first relaying winding member is preferably provided to be swingable about the vertical axis, wherein a second support frame which supports the second transport winding member and the second relaying winding member is preferably connected to the adjacent conveyor for swinging integrally with the adjacent conveyor about the vertical axis, wherein the second operatively connecting member is preferably formed by the third operatively connecting member and the adjacent conveyor, wherein, with a location at which the first operatively connecting member is connected to the first support frame being defined to be a first connecting location, and with a location at which the third operatively connecting member is connected to the adjacent conveyor being defined to be a second connecting location, the operatively connecting mechanism is preferably configured such that the first connecting location and the second connecting location move about the vertical axis in a same direction and by a same straight line distance, as a result of a fact that the first operatively connecting member and the third operatively connecting member are moved by an actuation of the swing actuator device by a set amount, wherein a relationship between a first swing radius which is a distance from the vertical axis to the first connecting location and a second swing radius which is a distance from the vertical axis to the second connecting location is preferably set based on a relationship between an amount of swing of the first support frame and an amount of swing of the second support frame.

That is, since the second operatively connecting member is formed by the third operatively connecting member and the adjacent conveyor, it is not necessary to provide separately an operatively connecting member for causing the second transport winding member and the second relaying winding member to swing about the vertical axis, thus facilitating the simplification of the structure of the operatively connecting mechanisms.

And, by moving the first connecting location and the second connecting location about the vertical axis in the same direction and by the same straight line distance, by moving the first operatively connecting member and the third operatively connecting member, the first support frame can be caused to swing about the vertical axis in the direction in which the second support frame and the adjacent conveyor swing, and by the amount that is greater by the desired amount with respect to the second support frame and the adjacent conveyor.

When causing the first support frame to swing about the vertical axis in the direction in which the second support frame and the adjacent conveyor swing, and by an amount of swing that is greater than (twice, for example) an amount of swing of the second support frame and the adjacent conveyor, the swing direction and the distance of the movement of the first connecting location moved by the first operatively connecting member and the swing direction and the distance of the movement of the second connecting location moved by the third operatively connecting member are the same, which makes it easier to design the operatively connecting mechanism having these first operatively connecting member and the third operatively connecting member.

Incidentally, when moving the first connecting location and the second connecting location by the same straight line distance (chord length), as described above, to cause the first support frame to swing through angle $\theta 1$, and to cause the adjacent conveyor and the second support frame to swing through angle $\theta 2$, the relationship between the first swing radius r1 which is the distance from the vertical axis to the first connecting location and the second swing radius r2 which is the distance from the vertical axis to the second connecting location is given by $$2 \cdot r1 \cdot \sin(\theta 1/2) = 2 \cdot r2 \cdot \sin(\theta 2/2).$$

Note that the unit for the angles is radian.

BRIEF DESCRIPTION OF THE DRAWINGS

FIG. 14 is a plan view of the operatively connecting mechanism of Alternative embodiment (2).

MODES FOR CARRYING OUT THE INVENTION

Embodiments of a transport device including a receiving conveyor that functions as a transport conveyor are described next with reference to the drawings.

Figure 1:
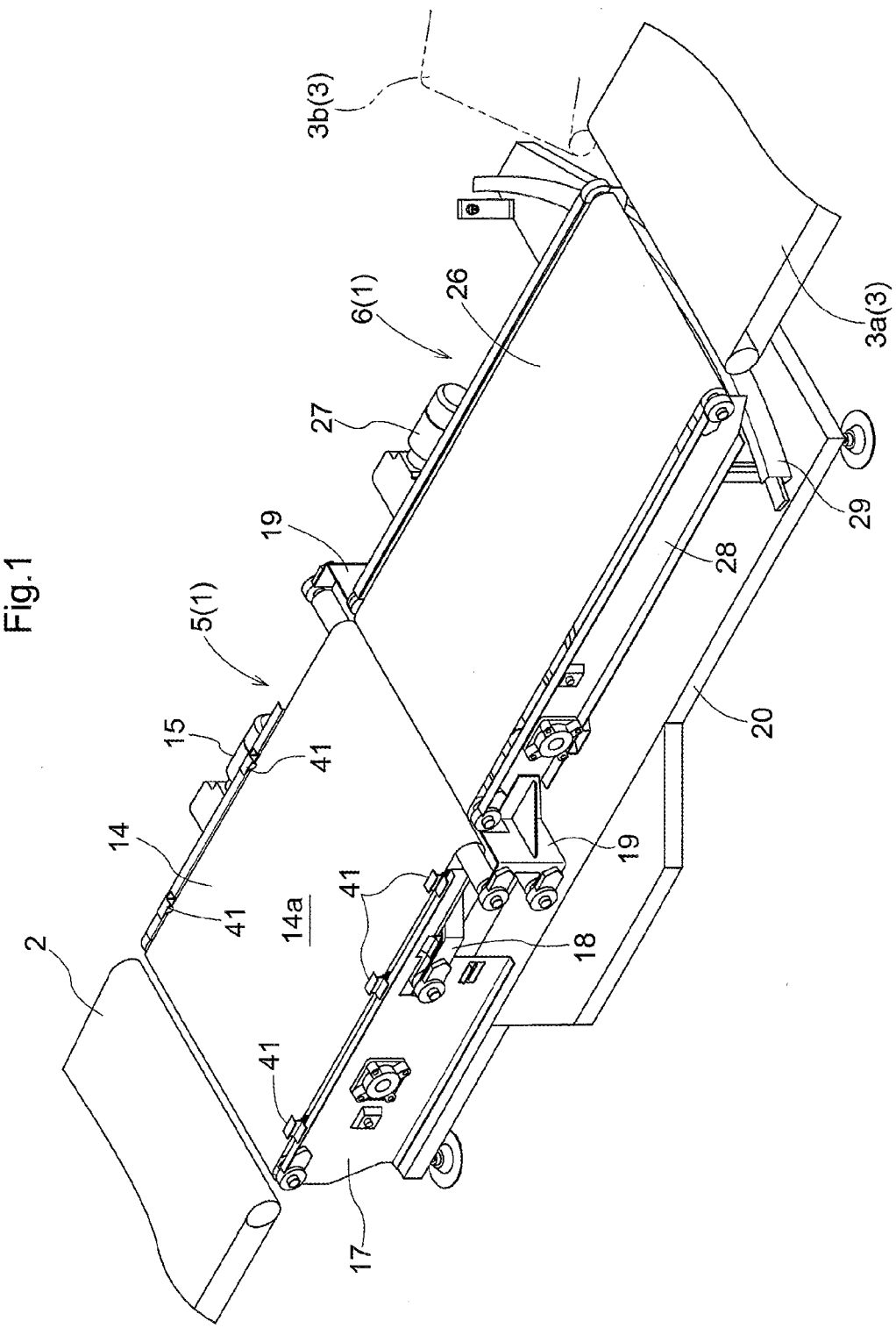
FIG. 1 is a perspective view of a transport device in a state in which a branch conveyor is switched to a straight forward transporting state.
Figure 2:
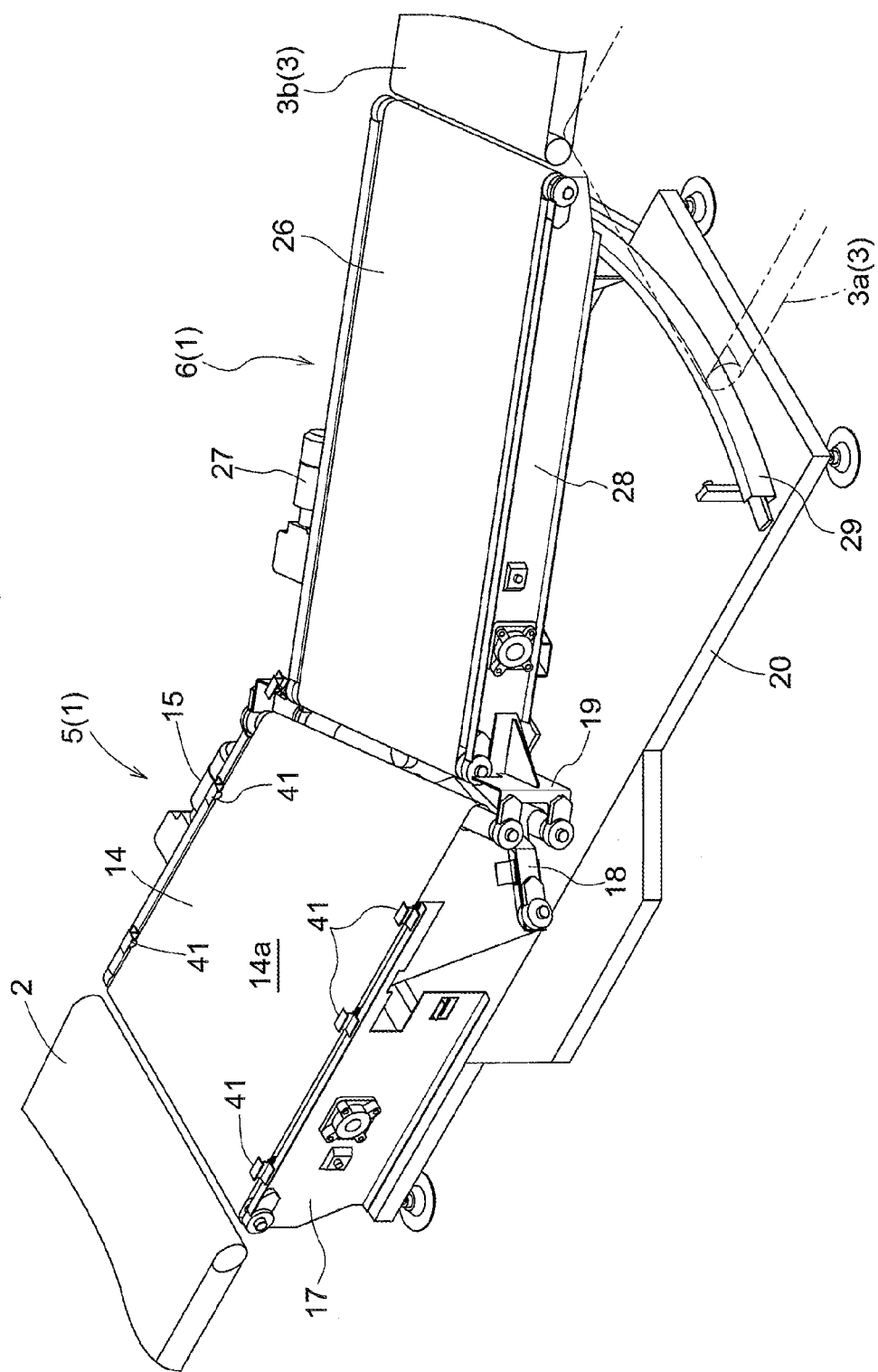
FIG. 2 is a perspective view of the transport device in a state in which the branch conveyor is switched to a branching transporting state.

As shown in FIGS. 1 and 2, the transport device includes a branch conveyor 1 that functions as a transport unit, an upstream conveyor 2, and downstream conveyors 3. The upstream conveyor 2 is installed on the upstream side of the branch conveyor 1 with respect to the transport direction whereas a pair of downstream conveyors 3, namely a downstream conveyor 3a for straight forward transporting and a downstream conveyor 3b for branching transporting are installed on the downstream side of the branch conveyor 1 with respect to the transport direction.

The transport device is configured to be able to transport articles transported from the upstream conveyor 2 selectively to the downstream conveyor 3a for straight forward transporting or to the downstream conveyor 3b for branching transporting by switching the branch conveyor 1 to a straight forward transporting state (see FIG. 1) or to a branching transporting state (see FIG. 2).

Note that, in the present embodiment, the transport direction (branching direction) of the downstream conveyor 3b for branching transporting is tilted counterclockwise by 30 degrees in plan view with respect to the transport direction (direction of straight forward transporting) of the upstream conveyor 2 and the downstream conveyor 3a for straight forward transporting. In addition, the horizontal direction that is perpendicular to the straight forward transporting direction may be sometimes referred to as a lateral direction.

The branch conveyor 1 consists of a receiving conveyor 5 (which corresponds to the transport conveyor of the present invention), and a swing conveyor 6 (which corresponds to the adjacent conveyor of the present invention) provided adjacent to, and downstream of, this receiving conveyor 5 with respect to the transport direction. In the present embodiment, in the branch conveyor 1, the upstream side, with respect to the transport direction, of the receiving conveyor 5 is defined to be the first direction side which is one side with respect to the transport direction whereas the downstream side, with respect to the transport direction, of the receiving conveyor 5 is defined to be the second direction side which is the other side with respect to the transport direction.

Figure 4:
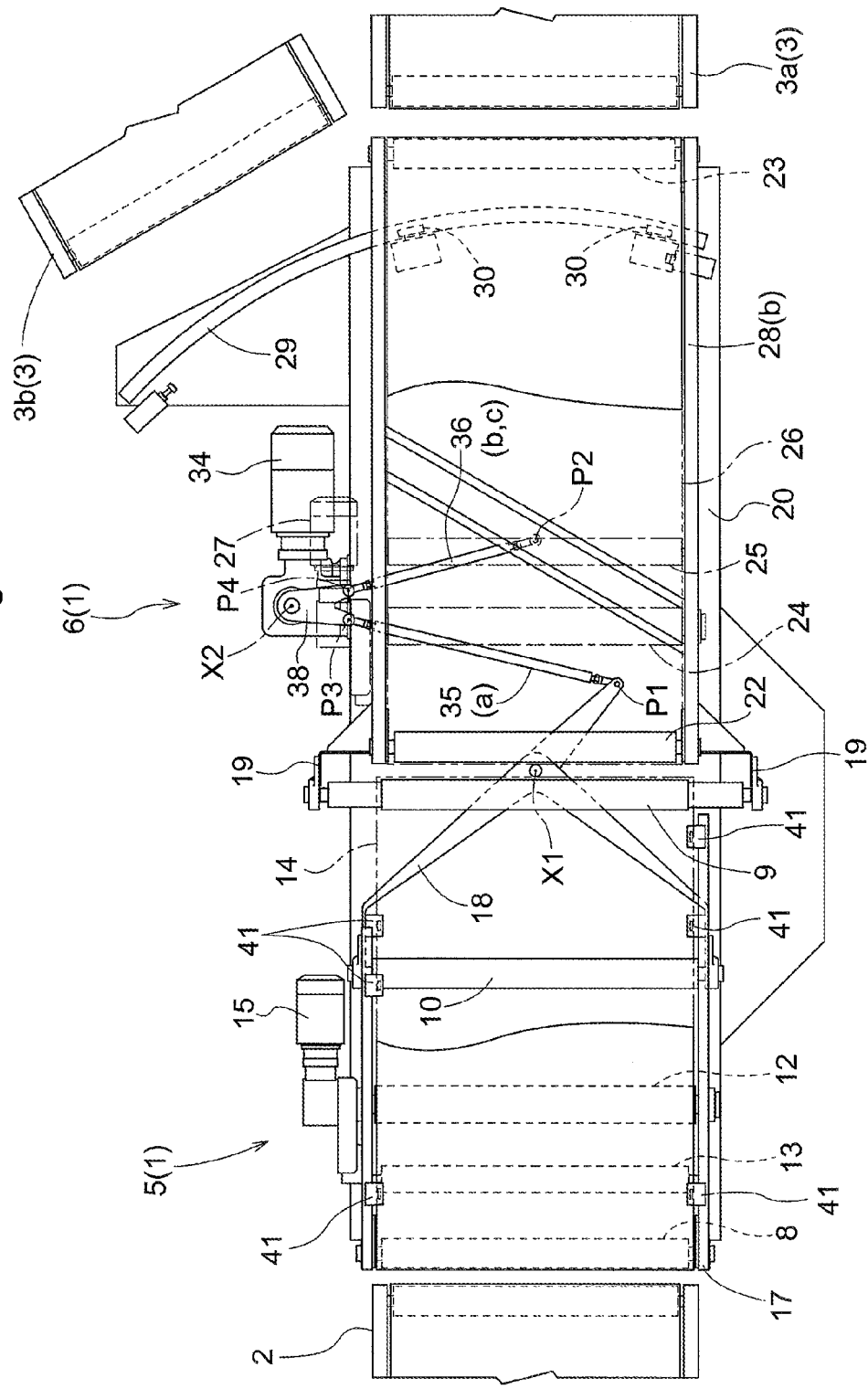
FIG. 4 is a partially cut-away plan view of the branch conveyor switched to the straight forward transporting state.
Figure 5:
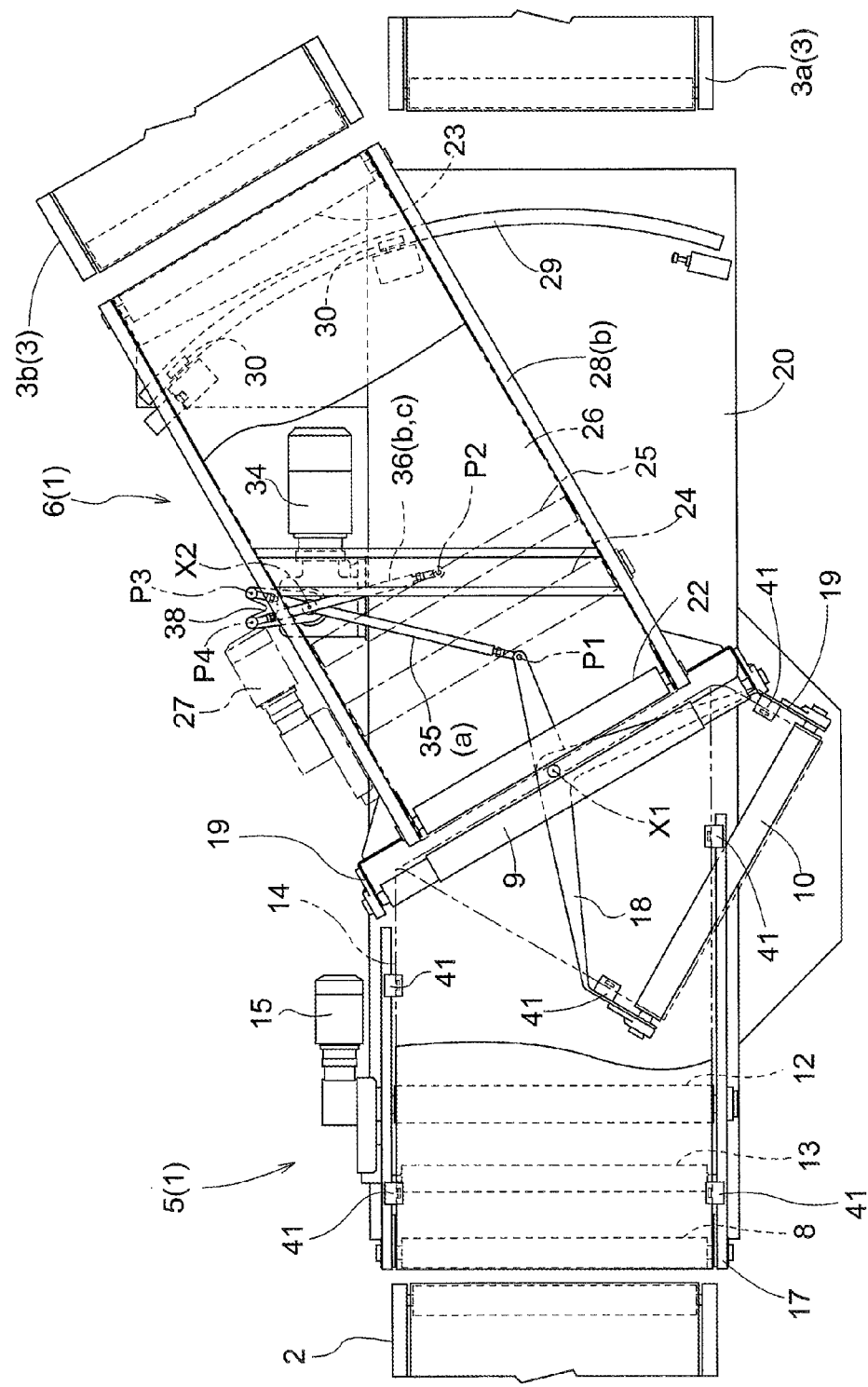
FIG. 5 is a partially cut-away plan view of the branch conveyor switched to the branching transporting state.

The branch conveyor 1 is configured to be switched to the straight forward transporting state for transporting articles to the downstream conveyor 3a for straight forward transporting as shown in FIGS. 1 and 4, and to the branching transporting state for transporting articles to the downstream conveyor 3b for branching transporting as shown in FIGS. 2 and 5. And the branch conveyor 1 is configured to transport articles transported from the upstream conveyor 2 to the downstream conveyor 3a for straight forward transporting when switched to the straight forward transporting state, and to transport articles transported from the upstream conveyor 2 to the downstream conveyor 3b for branching transporting when switched to the branching transporting state. Note that the some portions are shown cutaway in FIGS. 4 and 5.

The specific structure of the receiving conveyor 5 is described next.

Figure 3:
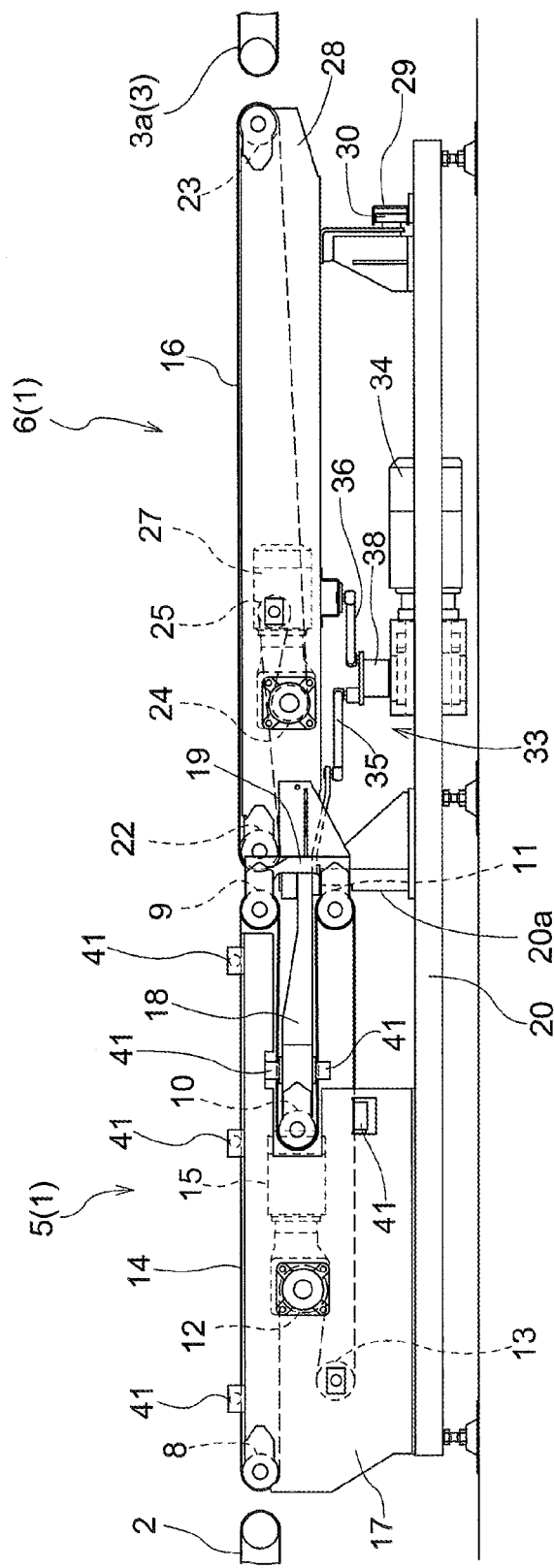
FIG. 3 is a side view of the branch conveyor.

As shown in FIGS. 3-5, the receiving conveyor 5 is provided with rotatable members 8-11 as a plurality of winding members (first transporting rotatable member 8, second transporting rotatable member 9, first relaying rotatable member 10, and second relaying rotatable member 11), a receiving endless belt 14 as an endless belt which is wound over a driving rotatable member 12 and a tensioning rotatable member 13, and a receiving transport motor 15 which functions as a transport actuator device which drivingly rotates the driving rotatable member 12. And the receiving conveyor 5 is configured to transport articles placed on a upward-facing transporting surface of the receiving endless belt 14 along the transport direction (straight forward transporting direction) as the result of the fact that the driving rotatable member 12 is drivingly rotated by the receiving transport motor 15 to cause the receiving endless belt 14 to move along its longitudinal direction.

The first transporting rotatable member 8 is provided in an end portion on the upstream side of the receiving conveyor 5 with respect to the transporting direction (end portion, on one side (first direction side) with respect to the transport direction, of the transport portion 14a of the receiving endless belt 14) whereas the second transporting rotatable member 9 is provided in an end portion on the downstream side of the receiving conveyor 5 with respect to the transporting direction (end portion, on the other side (second direction side) with respect to the transport direction, of the transport portion 14a of the receiving endless belt 14).

In addition, the first relaying rotatable member 10 is provided to be located at a lower position than the first transporting rotatable member 8 and the second transporting rotatable member 9, and to be located between the first transporting rotatable member 8 and the second transporting rotatable member 9 along the transport direction. The second relaying rotatable member 11 is provided to be located at a lower position than the first transporting rotatable member 8 and the second transporting rotatable member 9, and to be located downstream of the first relaying rotatable member 10 with respect to the transport direction. In the present embodiment, the second relaying rotatable member 11 is located directly below the second transporting rotatable member 9 (i.e., same position in plan view). The driving rotatable member 12 is disposed between the first transporting rotatable member 8 and the first relaying rotatable member 10 along the transport direction. The tensioning rotatable member 13 is provided to be located upstream of the driving rotatable member 12 with respect to the transport direction, and more specifically, between the first transporting rotatable member 8 and the driving rotatable member 12 along the transport direction.

In addition, the first transporting rotatable member 8 and the second transporting rotatable member 9 are located at the same height. The first relaying rotatable member 10 and the driving rotatable member 12 are located at the same height. And the second relaying rotatable member 11 and the tensioning rotatable member 13 are located at the same height.

The receiving endless belt 14 is wound over the first transporting rotatable member 8, the second transporting rotatable member 9, the first relaying rotatable member 10, the second relaying rotatable member 11, the tensioning rotatable member 13, the driving rotatable member 12, and the first transporting rotatable member 8, in that order. And the transporting surface is formed by the upward-facing surface of the transport portion 14a located between the first transporting rotatable member 8 and the second transporting rotatable member 9.

Each of the first transporting rotatable member 8, the second transporting rotatable member 9, the first relaying rotatable member 10, the second relaying rotatable member 11, the driving rotatable member 12, and the tensioning rotatable member 13 is provided to the receiving conveyor 5 for free rotation. These rotatable members 8-13 rotate as the receiving endless belt 14 moves along its longitudinal direction. Note that the first transporting rotatable member 8 corresponds to the first transport winding member. The second transporting rotatable member 9 corresponds to the second transport winding member. The first relaying rotatable member 10 corresponds to the first relaying winding member. And the second relaying rotatable member 11 corresponds to the second relaying winding member.

When the receiving conveyor 5 is installed such that the transporting surface is horizontal and the branch conveyor 1 is switched to the straight forward transporting state, the rotation axis of each of the first transporting rotatable member 8, the second transporting rotatable member 9, the first relaying rotatable member 10, the second relaying rotatable member 11, the driving rotatable member 12, and the tensioning rotatable member 13 extends along the lateral direction so that the directions of the rotation axes of these rotatable members 8-13 are parallel to one another.

In addition, the receiving conveyor 5 has a base frame 17 which supports the first transporting rotatable member 8, the driving rotatable member 12, and the tensioning rotatable member 13 for rotation about respective horizontal rotation axes, a first support frame 18 which supports the first relaying rotatable member 10 for rotation about a horizontal rotation axis, and a second support frame 19 which supports the second transporting rotatable member 9 and the second relaying rotatable member 11 for rotation about respective horizontal rotation axes. The base frame 17 is fixedly connected to the base platform 20 fixed to the floor surface on which the receiving conveyor 5 (branch conveyor 1) is installed whereas the first support frame 18 and the second support frame 19 is connected to the base platform 20 to be swingable about a first axis X1 (which corresponds to the vertical axis) that extends along the vertical direction and is located in the downstream end portion, with respect to the transport direction, of the receiving conveyor 5. In addition, the receiving transport motor 15 is supported by the base frame 17.

The support member 20a is provided to stand vertically on the base platform 20. And the first support frame 18 is connected to the support member 20a of the base platform 20 so as to be swingable about the first axis X1. In addition, the frame member 28 of the swing conveyor 6 is connected to the support member 20a so as to be swingable about the first axis X1 whereas the second support frame 19 is connected to the support member 20a so as to be swingable about the first axis X1 through the frame member 28, as the result of the fact that the second support frame 19 is connected to the frame member 28.

In this fashion, the second transporting rotatable member 9, the first relaying rotatable member 10, and the second relaying rotatable member 11 are supported to be swingable about the first axis X1 located in the downstream end portion, with respect to the transport direction, of the receiving conveyor 5.

Incidentally, the first axis X1 is located at the center of the receiving endless belt 14 along the lateral direction in plan view and is located downstream of the second transporting rotatable member 9 with respect to the transport direction. And the first axis X1 and the second transporting rotatable member 9 are displaced from each other along the transport direction by an approximate dimension of the radius, which is shorter than the diameter, of the second transporting rotatable member 9.

The swing conveyor 6 is described further next.

The swing conveyor 6 is provided with an upstream-side rotatable member 22, a downstream-side rotatable member 23, a driving rotatable member 24, and a tensioning rotatable member 25, a swing endless belt 26 that is wound over these rotatable members 22-25, and a swing transport motor 27. And the portion of the swing endless belt 26 that forms the transporting surface is moved along the transport direction as the result of the fact that the driving rotatable member 24 is drivingly rotated by the swing transport motor 27. In addition, when the swing conveyor 6 is installed such that the transporting surface is horizontal and the branch conveyor 1 is switched to the straight forward transporting state, the rotation axis of each of the upstream-side rotatable member 22, the downstream-side rotatable member 23, the driving rotatable member 24, and the tensioning rotatable member 25 extends along the lateral direction so that the directions of the rotation axes of these rotatable members 22-25 are parallel to one another.

The swing conveyor 6 includes a frame member 28 which supports the upstream-side rotatable member 22, the downstream-side rotatable member 23, the driving rotatable member 24, and the tensioning rotatable member 25 for rotation about respective horizontal rotation axes. And this frame member 28 is connected to the base platform 20 so as to be swingable about the first axis X1 extending along the vertical direction. The first axis X1 is located upstream (on the side in which the receiving conveyor 5 is located with respect to the transport direction) of the frame member 28 of the swing conveyor 6. The swing conveyor 6 is provided with an arc-shaped guide rail 29 that is connected to and support by the base platform 20 for guiding, about the first axis X1, the end portion of the frame member 28 on the downstream side with respect to the transport direction (on the side opposite from the side in which the receiving conveyor 5 is located along the transport direction), and a guide roller 30 which is connected to and supported by the frame member 28, and is guided by the guide rail 29.

Incidentally, the swing conveyor 6 is configured to have such a length that, when the branch conveyor 1 is switched to the branching transporting state, the downstream side end of the swing conveyor 6 with respect to the transport direction is moved laterally out of the lateral width of the swing endless belt 26 of the branch conveyor 1 in the straight forward transporting state.

The arrangement for switching the branch conveyor 1 to a straight forward transporting state and to a branching transporting state is described next.

As shown in FIGS. 4 and 5, the branch conveyor 1 (receiving conveyor 5) is provided with an operatively connecting mechanism 33 (see FIG. 3) which operatively connects the first support frame 18, the second support frame 19, and the frame member 28.

This operatively connecting mechanism 33 operatively connects the first support frame 18, the second support frame 19, and the frame member 28 to one another so as to swing the first support frame 18 about the first axis X1 in the same direction as the direction in which the second support frame 19 swings and by the amount of swing that is greater than (twice, in the present embodiment) the amount of swing of the second support frame 19, as the second support frame 19 and the frame member 28 swing about the first axis X1.

In addition, the second support frame 19 and the frame member 28 are integrally connected: and the second support frame 19 is connected to the frame member 28 of the swing conveyor 6 so as to swing integrally with the swing conveyor 6 about the first axis X1. Thus, as the frame member 28 swings about the first axis X1, the second support frame 19 swings in the same direction as the direction in which the frame member 28 swings and by the same amount of swing as that of the frame member 28. The operatively connecting mechanism 33 is configured to operatively connect the swing conveyor 6 to the first support frame 18 and the second support frame 19 so as to cause the swing conveyor 6 to swing about the first axis X1 by the same amount of swing as that of the second support frame 19, as the second support frame 19 swings about the first axis X1.

The operatively connecting mechanism 33 is described in more detail.

The operatively connecting mechanism 33 includes a connecting member 38 actuated and rotated about a second axis X2 extending along the vertical direction by a swing motor 34 which functions as a swing actuator device, a first link 35 whose proximal end portion is connected to the connecting member 38 and whose distal end portion is connected to the first support frame 18, and a second link 36 whose proximal end portion is connected to the connecting member 38 and whose distal end portion is connected to the frame member 28. Note that a first operatively connecting member "a" which operatively connects the first relaying rotatable member 10 to the swing motor 34 consists of or, is formed by, the first link 35 and the first support frame 18 whereas a third operatively connecting member "c" which operatively connects the swing conveyor 6 to the swing motor 34 consists of, or is formed by, the second link 36. In addition, a second operatively connecting member "b" which operatively connects the second transporting rotatable member 9 and the second relaying rotatable member 11 to the swing motor 34 consists of, or is formed by, the second link 36, the frame member 28 (swing conveyor 6), and the second support frame 19.

Here, the connecting location between the distal end portion of the first link 35 and the first support frame 18 will be referred to as the first connecting location P1 whereas the connecting location between the distal end portion of the second link 36 and the frame member 28 will be referred to as the second connecting location P2. In the present embodiment, the distance, along a straight line, from the second connecting location P2 to the first axis X1 in plan view is set to be about twice the distance, along a straight line, from the first connecting location P1 to the first axis X1 in plan view. The first link 35 is connected with the first support frame 18, and the second link 36 is connected with the frame member 28, with such a relationship between the distances.

Incidentally, as shown in FIGS. 4 and 5, when the first connecting location P1 and the second connecting location P2 are moved by the same straight line distance (chord length) to swing the first support frame 18 by 60 degrees and the second support frame 19 and the frame member 28 by 30 degrees, the relationship between the distance (first swing radius r1), along a straight line, from the first axis X1 to the first connecting location P1 in plan view and the distance (second swing radius r2) from the first axis X1 to the second connecting location P2 in plan view is given by $$2 \cdot r \cdot \sin(60/2) = 2 \cdot r2 \cdot \sin(30/2).$$

Note that the unit for the angles (the unit for the values "60" and "30" in the above formula) is degrees.

By having such a relationship between the first swing radius r1 and the second swing radius r2, the amount of swing of the first support frame 18 can be made twice the amount of swing of the second support frame 19 and the frame member 28 when the first connecting location P1 and the second connecting location P2 are moved by the same straight line distance; thus, the amount of change in the winding path length at each position along a belt width direction when the orientation of the branch conveyor 1 is switched can be reduced.

In addition, the proximal end portions of the first link 35 and the second link 36 are connected to locations in the connecting member 38 that are displaced from the second axis X2. With the connecting location between the proximal end portion of the first link 35 and the connecting member 38 being defined to be a third connecting location P3 and the connecting location between the proximal end portion of the second link 36 and the connecting member 38 being defined to be a fourth connecting location P4, the distance, along a straight line, from the third connecting location P3 to the second axis X2 in plan view and the distance, along a straight line, from the fourth connecting location P4 to the second axis X2 in plan view are the same. The first link 35 and the second link 36 are connected to the connecting member 38 with such a relationship between the distances.

In addition, as shown in FIGS. 4 and 5, the first link 35 is formed to be longer than the second link 36.

The first axis X1 and the second connecting location P2 are located in the central portion, along the lateral direction, of the receiving endless belt 14 and the swing endless belt 26 respectively. And although the first connecting location P1 is located within the lateral widths of the receiving endless belt 14 and the swing endless belt 26, it is located at a location that is offset toward one side (on the side opposite from the side in which the downstream conveyor 3b for branching transporting is located) from respective central portions, along the lateral direction, of these endless belts 14, 26.

In addition, the swing motor 34 and the connecting member 38 are located on the other side (on the side in which the downstream conveyor 3b for branching transporting is located), along the lateral direction, of the receiving endless belt 14 and the swing endless belt 26.

In addition, the first connecting location P1 is located downstream of the first axis X1 with respect to the transport direction. And the second connecting location P2 is located further downstream of the first connecting location P1. And the swing motor 34 and the connecting member 38 are disposed such that at least a part thereof is located between the first connecting location P1 and the second connecting location P2 along the transport direction.

In addition, as shown in FIG. 3, the first link 35 and the second link 36 are located between the base platform 20 and the frame member 28 in the vertical direction, and are at lower positions than the frame member 28 (swing conveyor 6). And the first link 35, the second link 36, and the frame member 28 are disposed within the vertical width of the receiving conveyor 5 (within the winding width, along the vertical direction, of the receiving endless belt 14).

Incidentally, as shown in FIGS. 4 and 5, the first connecting location P1 when the branch conveyor 1 is switched to the straight forward transporting state, the first connecting location P1 when the branch conveyor 1 is switched to the branching transporting state, the third connecting location P3 when the branch conveyor 1 is switched to the straight forward transporting state, the third connecting location P3 when the branch conveyor 1 is switched to the branching transporting state, and the second axis X2 are arranged to line up in a straight line in plan view. In addition, in a middle state between the straight forward transporting state and the branching transporting state (in the state in which first support frame 18 is swung counterclockwise by 30 degrees from the straight forward transporting state), the line segment that connects the first axis X1 and the first connecting location P1 and the line segment that connects the first connecting location P1 and the third connecting location P3 intersect each other perpendicularly in plan view.

Similarly, the second connecting location P2 when the branch conveyor 1 is switched to the straight forward transporting state, the second connecting location P2 when the branch conveyor 1 is switched to the branching transporting state, the fourth connecting location P4 when the branch conveyor 1 is switched to the straight forward transporting state, the fourth connecting location P4 when the branch conveyor 1 is switched to the branching transporting state, and the second axis X2 are arranged to line up in a straight line in plan view. In addition, in a middle state between the straight forward transporting state and the branching transporting state (in the state in which the frame member 28 is swung counterclockwise by 15 degrees from the straight forward transporting state), the line segment that connects the first axis X1 and the second connecting location P2 and the line segment that connects the second connecting location P2 and the fourth connecting location P4 intersect each other perpendicularly in plan view.

As described above, the proximal end portions of the first link 35 and the second link 36 are connected to locations in the connecting member 38 that are displaced from the second axis X2. Thus, by drivingly rotating the connecting member 38 with the swing motor 34, the proximal end portions of the first link 35 and the second link 36 are moved about the second axis X2.

And the operatively connecting mechanism 33 is configured to cause the first support frame 18 to swing about the first axis X1 in the direction in which the second support frame 19 and the frame member 28 swing and by the amount of swing that is twice the amount of swing of the second support frame 19 and the frame member 28 by causing the first connecting location P1 and the second connecting location P2 to be moved about the first axis X1 in the same direction and by the same straight line distance, when the connecting member 38 is swung about the second axis X2 by the actuating force of the swing motor 34 to move the first link 35 and the second link 36, as a result of the relationship between the position of the first axis X1, the position of the second axis X2, the connecting positions of the first link 35 with the connecting member 38 and the first support frame 18, the connecting positions of the second link 36 with the connecting member 38 and the frame member 28, etc.

More specifically, the operatively connecting mechanism 33 is configured to cause the first connecting location P1 and the second connecting location P2 to be moved counterclockwise about the first axis X1 such as to have the same chord length, from the state shown in FIG. 4 to the state shown in FIG. 5, as a result of the connecting member 38 having been rotated by 180 degrees, to cause the frame member 28 (swing conveyor 6) and the second support frame 19 connected thereto (the second transporting rotatable member 9 and the second relaying rotatable member 11) to swing counterclockwise by 30 degrees, and to cause the first support frames 18 (first relaying rotatable member 10) to swing counterclockwise by 60 degrees.

As shown in FIGS. 1-6, the receiving conveyor 5 is provided with meandering prevention mechanisms 41 for preventing the receiving endless belt 14 from meandering.

The meandering prevention mechanism 41 is provided to each of both end portions, along the lateral direction, of the receiving endless belt 14. And a plurality of sets of the pair of meandering prevention mechanisms 41 so provided are provided along the longitudinal direction of the receiving endless belt 14. Note that, as for the meandering prevention mechanism 41 provided in the transport downstream end portion of the transport portion 14a, only the meandering prevention mechanism 41 on one side (on the side opposite from the side in which the downstream conveyor 3b for branching transporting is located) along the lateral direction (of the pair of the meandering prevention mechanisms 41) is provided so as not to have the first support frame 18 and the meandering prevention mechanism 41 interfere with each other when the receiving conveyor 5 is switched to the branching transporting state.

Figure 6:
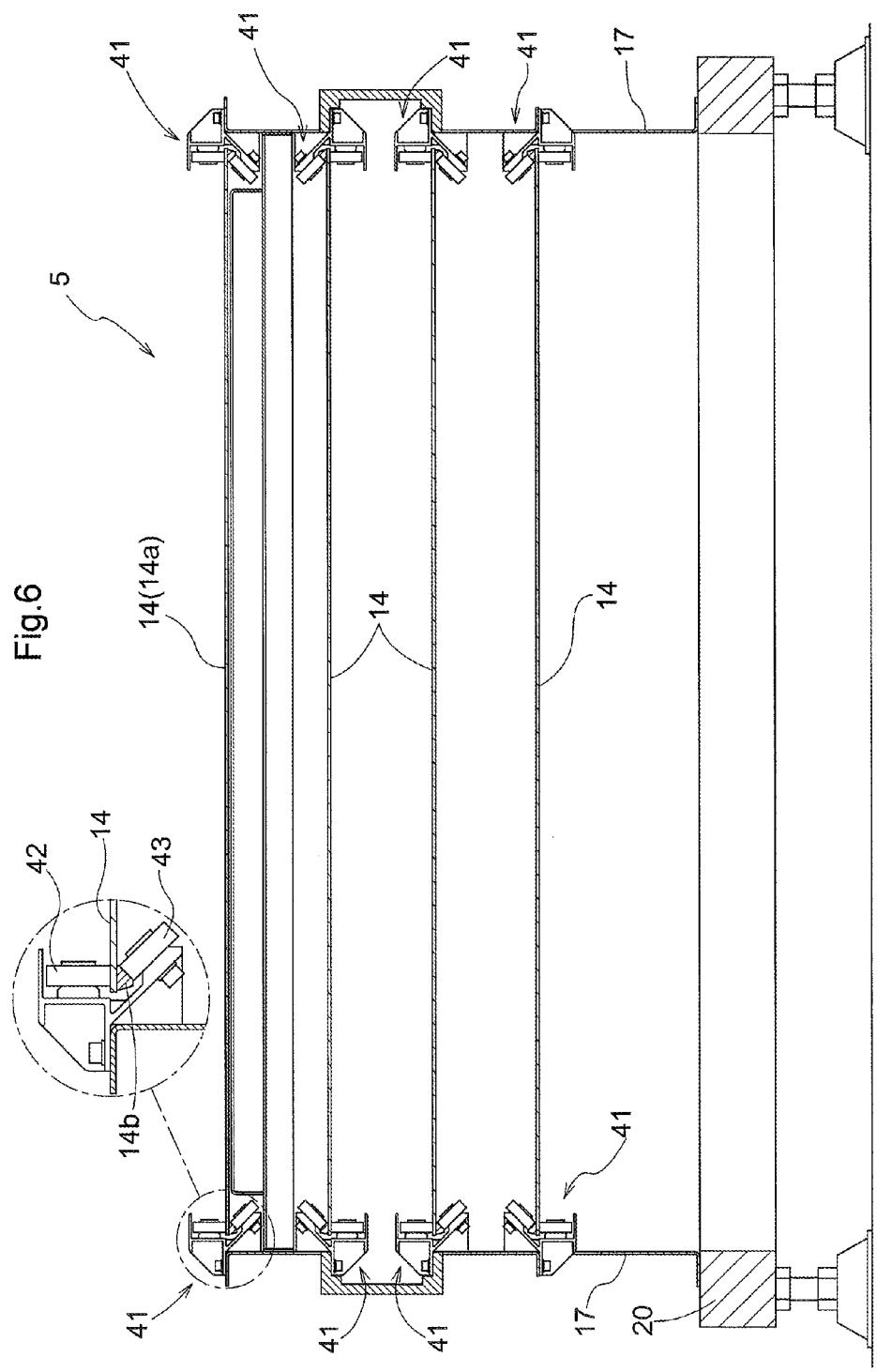
FIG. 6 is an elevational sectional front view of a receiving conveyor.

As shown in FIG. 6, each of the meandering prevention mechanism 41 includes a outward-side surface roller 42 for contacting the outward-side surface (surface on the side in which the transporting surface is formed) of the receiving endless belt 14, and a reverse-side surface roller 43 for contacting the reverse-side surface of the receiving endless belt 14. And these outward-side surface roller 42 and the reverse-side surface roller 43 are disposed to hold the receiving endless belt 14 therebetween.

On the reverse-side surface, and in the both end portions along the lateral direction, of the receiving endless belt 14, a projection 14b having a mountain-shape is formed along the longitudinal direction of the receiving endless belt 14. And the reverse-side surface roller 43 is disposed in an attitude in which its axis of rotation is tilted to match the laterally inner tilted surface of the projection 14b. The outward-side surface roller 42 is disposed in an attitude in which its axis of rotation is horizontal. The outward-side surface roller 42 and the reverse-side surface roller 43 are provided such that the distance between them is less than the thickness of the portion of the receiving endless belt 14 that has the projection 14b formed thereto. The receiving endless belt 14 is prevented from moving laterally inward as a result of the fact that the reverse-side surface roller 43 contacts the projection 14b from the lateral inner side, thereby restricting the meandering of the receiving endless belt 14.

As shown in FIG. 1-FIG. 6, the meandering prevention mechanisms 41 which restrict the meandering of the transport portion 14a are supported by the base frame 17. In other words, even when the first support frame 18 and the second support frame 19 are swung about the first axis X1 in order to switch the branch conveyor 1 from the straight forward transporting state to the branching transporting state, the meandering prevention mechanisms 41 which restrict meandering of the transport portion 14a are not swung about the first axis X1. Thus, even if the branch conveyor 1 is switched from the straight forward transporting state to the branching transporting state, the transport portion 14a is maintained in the orientation along the straight forward transporting direction; thus, the transport direction of the branch conveyor 1 is the same in the straight forward transporting state and in the branching transporting state.

The branch conveyor 1 is arranged such that the second transporting rotatable member 9, the first relaying rotatable member 10, and the second relaying rotatable member 11 are supported to be swingable about the first axis X1 that extends vertically and is located in the downstream end portion, with respect to the transport direction, of the receiving conveyor 5. In addition, the second transporting rotatable member 9 is located in a downstream end portion, with respect to the transport direction, of the transport portion 14a of the receiving endless belt 14.

The second transporting rotatable member 9, the first relaying rotatable member 10, and the second relaying rotatable member 11 are caused to swing in an operatively connected manner by the operatively connecting mechanism 33, to cause the second transporting rotatable member 9 and the second relaying rotatable member 11 to swing integrally about the first axis X1 and to cause the first relaying rotatable member 10 to swing about the first axis X1 in the direction in which the second transporting rotatable member 9 and the second relaying rotatable member 11 swing and by the amount of swing that is twice the amount of swing of the second transporting rotatable member 9 and the second relaying rotatable member 11.

And since the first axis X1 is located in the downstream end portion, along the transport direction, in which the second transporting rotatable member 9 is provided, the swing radius of the second transporting rotatable member 9 is small so that second transporting rotatable member 9 is swung in a small space.

[Alternative Embodiments]

(1) In the embodiment described above, one branch conveyor 1 is provided between the upstream conveyor 2 and the downstream conveyor 3; however, a plurality of branch conveyors 1 may be provided between upstream conveyors 2 and the downstream conveyors 3, depending on the number of the upstream conveyors 2 and the downstream conveyors 3.

Figure 7:
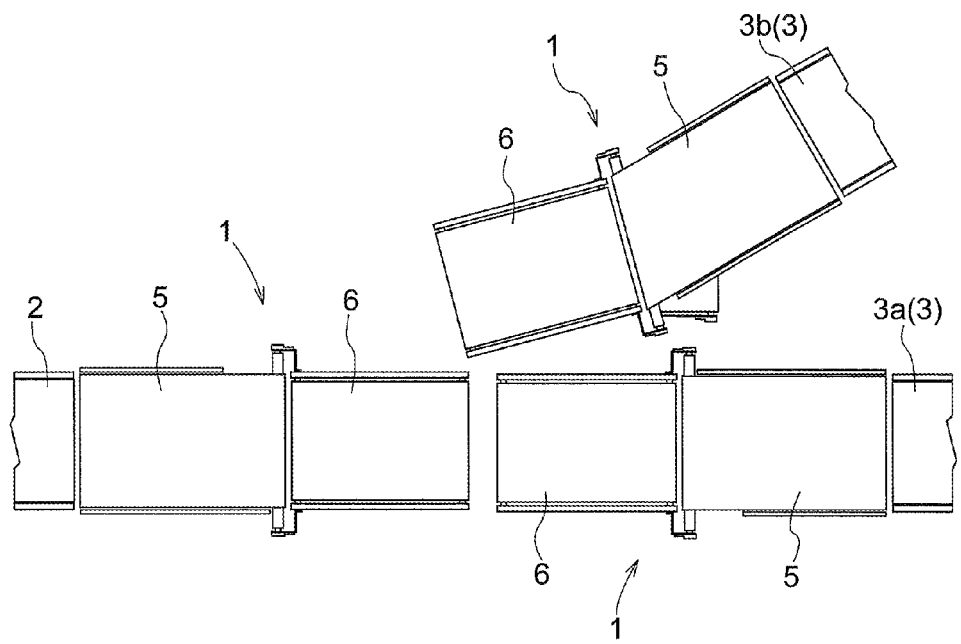
FIG. 7 is a plan view showing a transport device of Alternative embodiment (1) as it transports articles to the downstream conveyor for straight forward transporting.
Figure 8:
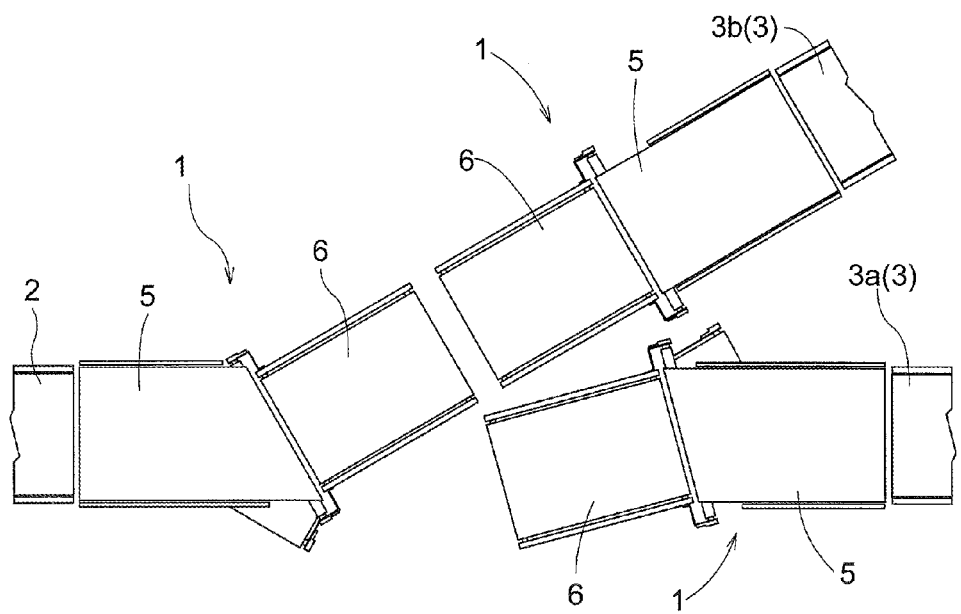
FIG. 8 is a plan view showing a transport device of Alternative embodiment (1) as it transports articles to the downstream conveyor for branching transporting.

More specifically, for example, as shown in FIGS. 7 and 8, when one upstream conveyor 2 is provided and two downstream conveyors 3 are provided: a first branch conveyor 1 may be provided adjacent to, and downstream of, the upstream conveyor 2 with respect to the travel direction; and, a second branch conveyor 1 may be provided adjacent to, and upstream of a downstream conveyor 3a for straight forward transporting, with respect to the travel direction; and, a third branch conveyor 1 may be provided adjacent to, and downstream of a downstream conveyor 3b for branching transporting, with respect to the travel direction.

Incidentally, the first through the third branch conveyors 1 are constructed similarly to the branch conveyor 1 in the embodiment described above except for the fact that the longitudinal length of the swing conveyors 6 is shorter.

When three branch conveyors 1 are provided as described above, the first branch conveyor 1 would be disposed such that the one side (the first direction side) along the transport direction is located on the upstream side whereas the other side (the second direction side) along the transport direction is located on the downstream side: and, the second branch conveyor 1 and the third branch conveyor 1 would be disposed such that the one side (the first direction side) along the transport direction is located on the downstream side whereas the other side (the second direction side) along the transport direction is located on the upstream side. And by switching the first branch conveyor 1 and the second branch conveyor 1 to the straight forward transporting state and switching the third branch conveyor 1 to the branching transporting state, articles transported from the upstream conveyor 2 can be transported to the downstream conveyor 3a for straight forward transporting. And by switching the first branch conveyor 1 and the second branch conveyor 1 to the branching transporting state, and switching the third branch conveyor 1 to the straight forward transporting state, articles transported from the upstream conveyor 2 can be transported to the downstream conveyor 3b for branching transporting.

Thus, by configuring a transport facility in this manner, the longitudinal length, along the transport direction, of the swing conveyors 6 can be made short.

(2) In the embodiment described above, a plurality of links 35 and 36 are provided to form the operatively connecting mechanism 33; however, the structure of the operatively connecting mechanism 33 may be changed suitably.

In other words, the operatively connecting mechanism 33 may be arranged as follows.

Figure 9:
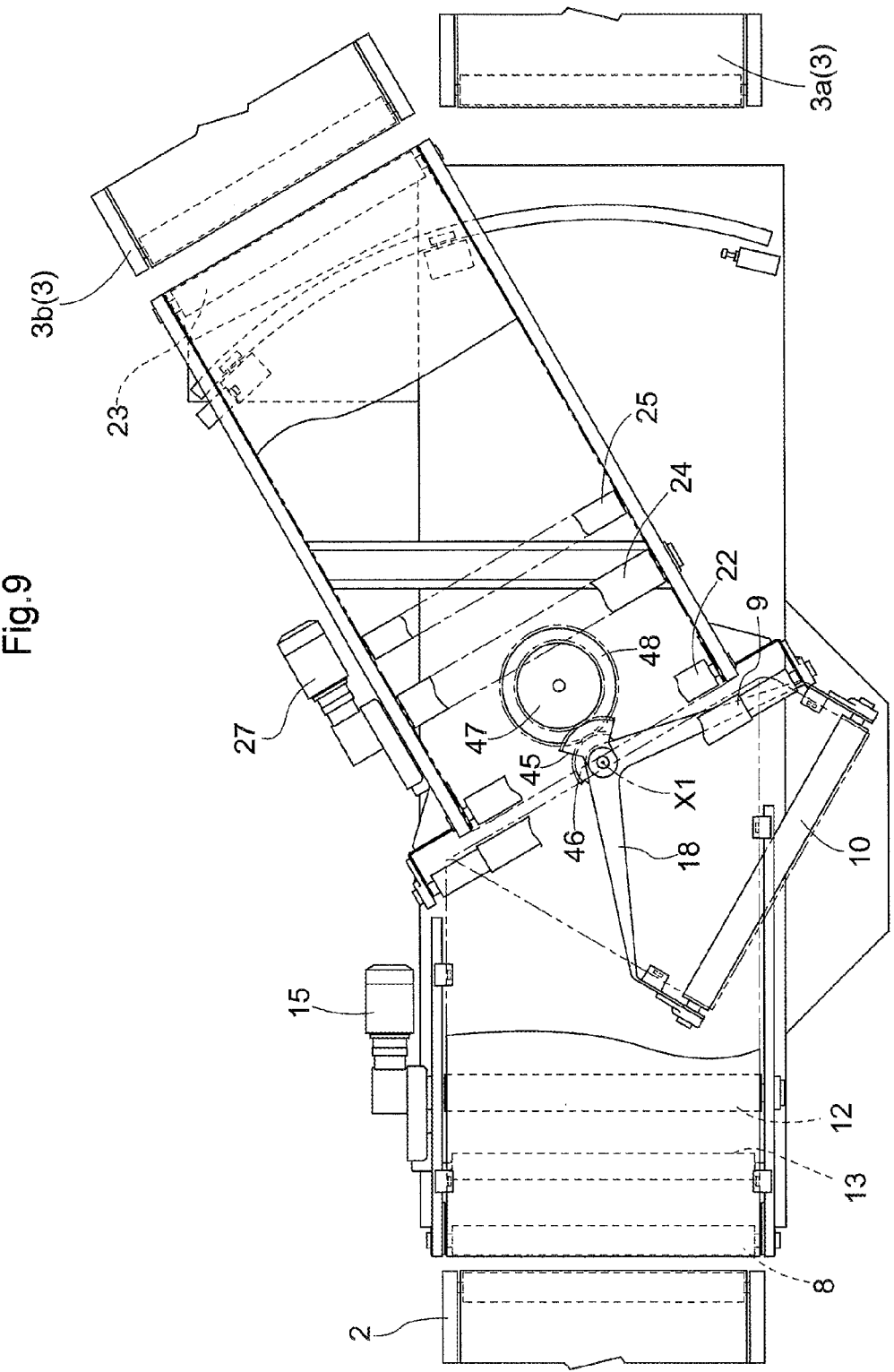
FIG. 9 is a plan view of a branch unit of Alternative embodiment (2), in which its operatively connecting mechanism is of a manually operated type.
Figure 10:
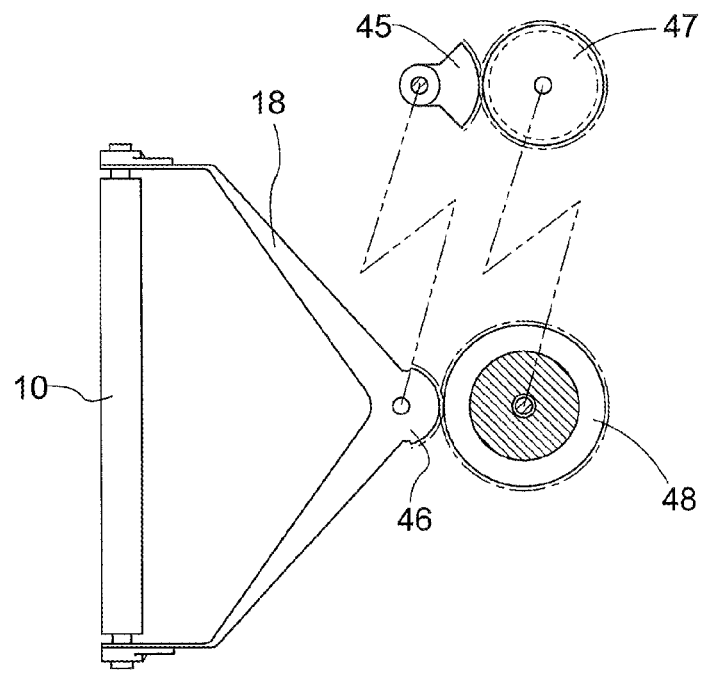
FIG. 10 is a broken-away plan view of the operatively connecting mechanism of Alternative embodiment (2)
Figure 11:
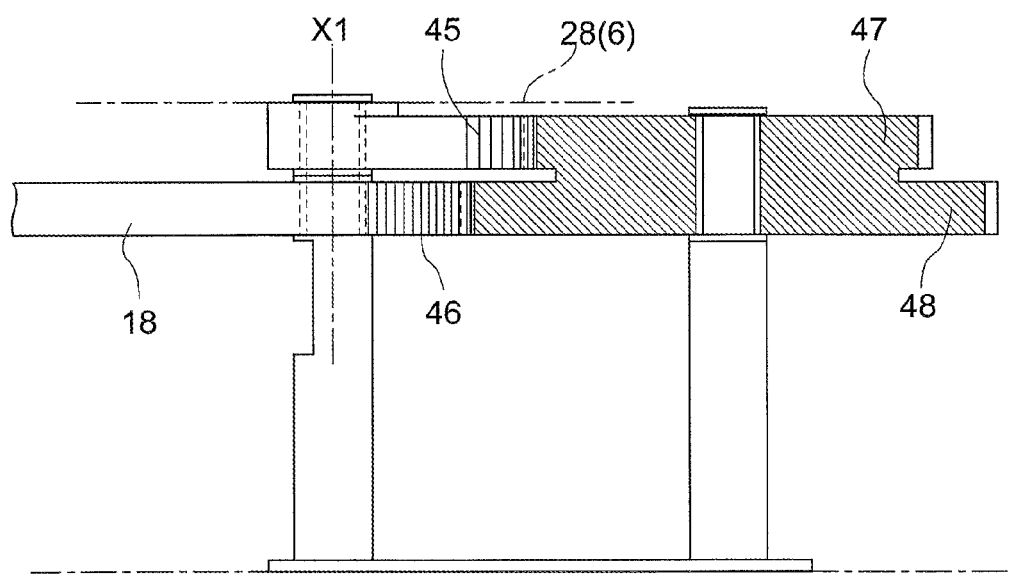
FIG. 11 is a side view of the operatively connecting mechanism of Alternative embodiment (2)

As shown in FIGS. 9-11, provided to the frame member 28 is a fan-shaped gear 45 which is rotated integrally with this frame member 28 about the first axis X1. And a gear portion 46 is formed in the first support frame 18. And a small-diameter gear 47 which meshes with the fan-shaped gear 45 and a large-diameter gear 48 which has a larger diameter than the small-diameter gear 47 and meshes with the gear portion 46 are provided such that they are rotated integrally.

By forming the operatively connecting mechanism 33 with such fan-shaped gear 45, gear portion 46, small-diameter gear 47, and large-diameter gear 48, and by having a worker manually rotate the swing conveyor 6 about the first axis X1, the small-diameter gear 47 and the large-diameter gear 48 are rotated and the first support frame 18 is swung in the same direction as the direction in which the swing conveyor 6 is swung and is swung by twice the amount of swing of the swing conveyor 6. And the second support frame 19 is swung in the same direction as the direction in which the swing conveyor 6 is swung and by the same amount of swing of the swing conveyor 6.

Even when a plurality of links 35 and 36 are provided to form the operatively connecting mechanism 33, the structure of the operatively connecting mechanism 33 may be changed suitably.

More specifically, as shown in FIG. 14, an output gear 51 which is driven and rotated about the second axis X2 by a swing motor 34 (not shown) is meshed with a counter-rotating relay gear 52. A first swing rotation gear 53 is meshed with the counter-rotating relay gear 52. And the second swing rotation gear 54 is meshed with the output gear 51. And the operatively connecting mechanism 33 may be formed by connecting the proximal end portion of the first link 35 to the first swing rotation gear 53 and by connecting the proximal end portion of the second link 36 to the second swing rotation gear 54.

As shown in FIG. 14(a), by drivingly rotating the output gear 51 and the counter-rotating relay gear 52 with the swing motor 34 by a predetermined amount starting from the state in which the branch conveyor 1 is switched to the straight forward transporting state, the first swing rotation gear 53 is rotated counterclockwise and the second swing rotation gear 54 is rotated clockwise. Thereby, the operatively connecting mechanism 33 is configured such that the first link 35 and the second link 36 are moved while the first connecting location P1 and the second connecting location P2 are moved counterclockwise about the first axis X1 such as to have the same cord length, causing the frame member 28 (swing conveyor 6) and the second support frame 19 (the second transporting rotatable member 9 and the second relaying rotatable member 11) connected therewith to swing counterclockwise by 30 degrees and causing the first support frames 18 (first relaying rotatable member 10) to swing counterclockwise by 60 degrees to switch the branch conveyor 1 to the branching transporting state as shown in FIG. 14 (*b*).

(3) In the embodiment described above, the swing motor 34 is provided to function as a swing actuator device; however, other actuator device, such as a cylinder, may be provided to function as a swing actuator device.

In addition, in the embodiment described above, the swing actuator device is provided and the first support frame 18 and the second support frame 19 were swung by means of the actuating force of the swing actuator device; however, these first support frames 18 and the second support frame 19 may be swung by a worker's manual operation.

By way of providing specific examples, in the alternative embodiment (2) described above, the first support frame 18 and the second support frame 19 which are operatively connected by the operatively connecting mechanism 33 may be swung by swinging the swing conveyor 6 about the first axis X1 with a swing actuator device, such as a cylinder. In addition, the first support frame 18 and the second support frame 19 which are operatively connected by the operatively connecting mechanism 33 may be swung by swinging the swing conveyor 6 about the first axis X1 by a worker's manual operation.

(4) In the embodiment described above, a downstream conveyor 3*a* for straight forward transporting and a downstream conveyor 3*b* for branching transporting are provided as the downstream conveyors 3. And arrangements are made so that the articles are selectively transported to the downstream conveyor 3*a* for straight forward transporting or to the downstream conveyor 3*b* for branching transporting by switching the branch conveyor 1 to the straight forward transporting state or to the branching transporting state. However, only one of the downstream conveyor 3*a* for straight forward transporting and the downstream conveyor 3*b* for branching transporting may be provided as the downstream conveyor 3; and, the branch conveyor 1 may be provided in an orientation that corresponds to the orientation of the downstream conveyor 3 so that the state of the branch conveyor 1 would not be switched during the transporting of the articles.

More specifically, for example, only a downstream conveyor 3*b* for branching transporting may be provided as the downstream conveyor 3. And the branch conveyor 1 may be installed in the state in which it is switched to the branching transporting state. Or, only a downstream conveyor 3*a* for straight forward transporting may be provided as the downstream conveyor 3. And the branch conveyor 1 may be installed in the state in which it is switched to the straight forward transporting state.

Figure 12:
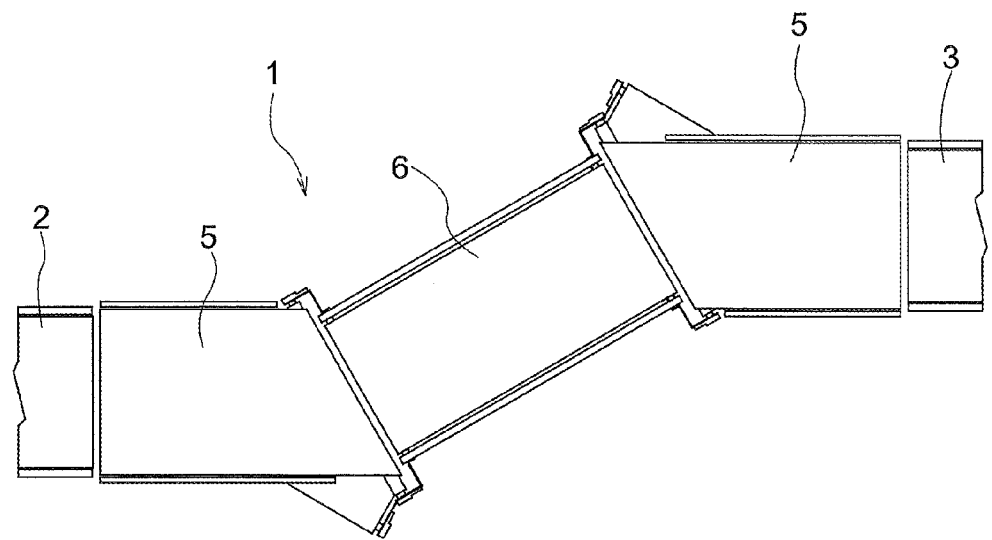
FIG. 12 is a plan view of the transport device of Alternative embodiment (3) in which its branch conveyor is formed by two receiving conveyors and one swing conveyor.

In addition, when the branch conveyor 1 is installed as described above in the state in which it is switched to the straight forward transporting state or the branching transporting state, the branch conveyor 1 may be formed by two receiving conveyors 5 and one swing conveyor 6 such that the receiving conveyors 5 are provided on either side, or on the upstream side and on the downstream side, of the swing conveyor 6 with respect to the transport direction shown in FIG. 12.

Figure 13:
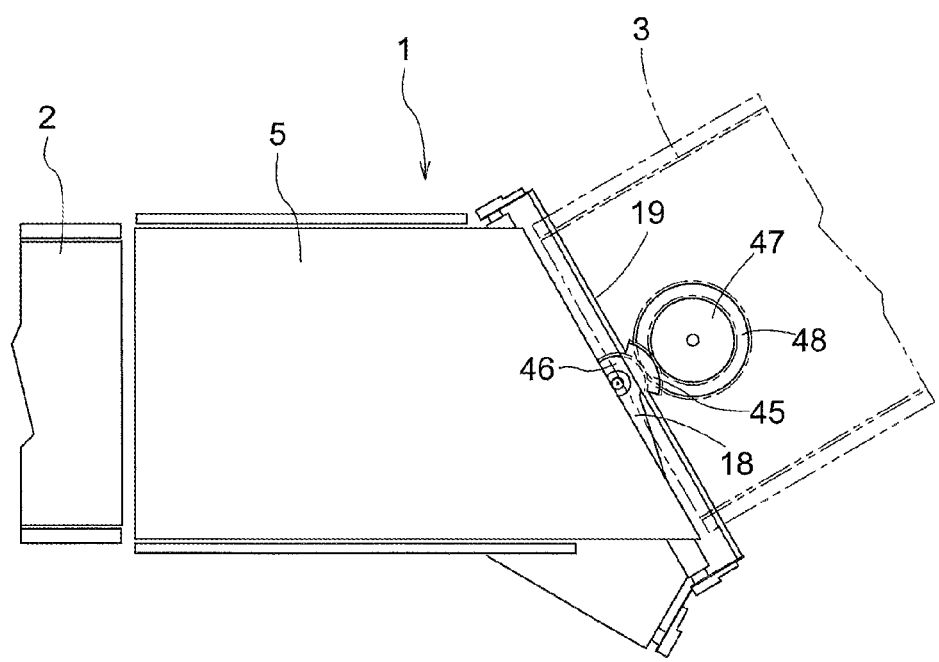
FIG. 13 is a plan view of the transport device of Alternative embodiment (3) in which its branch conveyor is formed by one receiving conveyor.

In addition, the branch conveyor 1 may be formed only by one receiving conveyor 5, in which case, the downstream conveyor 3 needs to be installed at a location that is displaced upstream with respect to the transport direction by the amount corresponding to the uninstalled swing conveyor 6. Incidentally, when the branch conveyor 1 is formed only by one receiving conveyor 5 in this fashion, the second support frame 19 operatively connected by the operatively connecting mechanism 33 may be caused to swing, by providing a fan-shaped gear 45 to the first support frame 18 so as to be rotated integrally therewith about the first axis X1, and by causing the first support frame 18 to swing about the first axis X1, as shown in FIG. 13. In addition, the second link 36 may be directly connected to the second support frame 19 so that the operatively connecting mechanism 33 does not have the third operatively connecting member "c".

(5) In the embodiment described above, one downstream conveyor 3*a* for straight forward transporting and one downstream conveyor 3*b* for branching transporting are provided. However, one downstream conveyor 3*a* for straight forward transporting and two downstream conveyors 3*b* for branching transporting may be provided. In addition, two downstream conveyors 3*b* for branching transporting may be provided without providing any downstream conveyor 3*a* for straight forward transporting.

(6) In the embodiment described above, the second support frames 19 is swung by 30 degrees when switching the branch conveyor 1 from the straight forward transporting state to the branching transporting state. However, the angle of the swing of the second support frame 19 when switching the branch conveyor 1 from the straight forward transporting state to the branching transporting state can be changed suitably. By way of specific examples, the angle of the swing of the second support frame 19 when switching the branch conveyor 1 from the straight forward transporting state to the branching transporting state may be set and changed within the range between 15 degrees and 40 degrees. Incidentally, arrangements may be made such that a plurality of swing angles within a set angular range (for example, 40 degrees) may be selected. For example, the second support frame 19 may be swung further from a branching transporting state (referred to as the first branching transporting state) to a branching transporting state (referred to as the second branching transporting state). For example, the second support frame 19 may be swung from the straight forward transporting state by 15 degrees to place it in the first branching transporting state; and, the second support frame 19 may be swung further from this first branching transporting state by 20 degrees to place it in the second branching transporting state.

In addition, in the embodiment described above, the branch conveyor 1 is switched, from the state in which it is switched to the straight forward transporting state, to the branching transporting state by causing the second support frame 19 to swing in one direction (swung counterclockwise). However, in addition to, or instead of, this branching transporting state, the branch conveyor 1 may be switched, from the state in which it is switched to the straight forward transporting state, to a branching transporting state by causing the second support frame 19 to swing in the other direction (to swing clockwise).

(7) In the embodiment described above, eleven meandering prevention mechanisms 41 are provided; however, the number of the meandering prevention mechanisms 41 installed may be changed suitably. For example, of the five meandering prevention mechanisms 41 provided to the transport portion 14*a*, only the two located on the transport downstream side (the meandering prevention mechanism 41 provided near the second transporting rotatable member 9, and the meandering prevention mechanism 41 provided near the receiving transport motor 15) may be provided.

In addition, when the receiving endless belt 14 is such that meandering of the receiving endless belt 14 only to one side along the lateral direction is expected, one or more meandering prevention mechanisms 41 may be provided only to the end, along the lateral direction, of the receiving endless belt 14 that is on the side opposite from the direction in which the meandering is expected to take place. Incidentally, the meandering of the receiving endless belt 14 may be arranged to take place only to one side, for example, by constructing the receiving conveyor 5 as follows. That is, it is conceivable to set the direction of the meandering by tilting, about a vertical axis or lateral (or right-and-left) axis, the orientation of one or more (for example, first relaying rotatable member 10) of the winding members provided to the receiving conveyor 5 with respect to the remaining winding members, with the branch conveyor 1 switched to the straight forward transporting state.

(8) In the embodiment described above, the projection 14b is formed only on the reverse-side surface of the receiving endless belt 14; however, the projection 14b may be formed only on the outward-side surface of the receiving endless belt 14. In addition, the projections 14b may be formed on both sides, i.e. the outward-side surface and the reverse-side surface of the receiving endless belt 14. Incidentally, when the projection 14b is formed on the outward-side surface of the receiving endless belt 14, the outward-side surface roller 42 is provided to be disposed in an attitude in which its axis of rotation is tilted to match the laterally inner tilted surface of the projection 14b.

(9) In the embodiment described above, one side (first direction side) along the transport direction is defined to be the upstream side with respect to the transport direction whereas the other side (second direction side) along the transport direction is defined to be the downstream side with respect to the transport direction. However, one side (first direction side) along the transport direction may be defined to be the downstream side with respect to the transport direction whereas the other side (second direction side) along the transport direction may be defined to be the upstream side with respect to the transport direction. When the receiving conveyor 5 (branch conveyor 1) is installed in such a state, an upstream conveyor for straight forward transporting and an upstream conveyor for merging travel, whose transport direction is tilted with respect to the upstream conveyor for straight forward transporting in plan view, may be provided as upstream conveyors 2.

(10) In the embodiment described above, the first transport winding member, the second transport winding member, the first relaying winding member, and the second relaying winding member are provided for free rotation so that these winding members are rotated as the endless belt moves. However, some or all of these winding members may be provided such that they cannot be rotated so that the endless belt would slide along the winding members as the endless belt moves.

(11) In the embodiment described above, the driving rotatable member 12 and the transport actuator device are supported by the base frame 17. However, for example, the first relaying rotatable member 10 may be arranged to be the driving rotatable member so that the first relaying rotatable member 10 is drivingly rotated by the transport actuator device and so that the driving rotatable member and the transport actuator device are supported by the first support frame 18.

DESCRIPTION OF REFERENCE NUMERALS AND SYMBOLS

1 Transport Unit
5 Transport Conveyor
6 Adjacent Conveyor
8 First Transport Winding Member
9 Second Transport Winding Member
10 First Relaying Winding Member
11 Second Relaying Winding Member
12 Driving Rotatable Member
14 Endless Belt
15 Transport Actuator Device
17 Base Frame
18 First Support Frame
19 Second Support Frame
33 Operatively Connecting Mechanism
a First Operatively Connecting Member
b Second Operatively Connecting Member
c Third Operatively Connecting Member
X Vertical axis

The invention claimed is:

1. A transport conveyor comprising:
an endless belt wound over a plurality of winding members and a driving rotatable member;
a transport actuator device for drivingly rotating the driving rotatable member;
wherein the transport conveyor transports an article placed on an upward-facing transporting surface of the endless belt along a transport direction, such that the driving rotatable member is drivingly rotated by the transport actuator device to move the endless belt along a longitudinal direction thereof,
wherein provided as the plurality of winding members are:
a first transport winding member located in an end portion, on a first direction side which is one side along the transport direction, of a transport portion that forms the transporting surface of the endless belt;
a second transport winding member located in an end portion, on a second direction side which is the other side along the transport direction, of the transport portion;
a first relaying winding member which is located at a lower position than the first transport winding member and the second transport winding member and which is located between the first transport winding member and the second transport winding member along the transport direction; and
a second relaying winding member which is located at a lower position than the first transport winding member and the second transport winding member and which is located on the second direction side of the first relaying winding member along the transport direction,
wherein the endless belt is wound over the first transport winding member, the second transport winding member, the first relaying winding member, the second relaying winding member, and the first transport winding member, in that order,
wherein the second transport winding member, the first relaying winding member, and the second relaying winding member are supported to be swingable about a vertical axis extending along a vertical direction and located in an end portion, on the second direction side, of the transport conveyor, and
wherein an operatively connecting mechanism is provided to cause the second transport winding member, the first relaying winding member, and the second relaying winding member to swing in an operatively connected manner to cause the second transport winding member and the second relaying winding member to swing integrally about the vertical axis and to cause the first relaying winding member to swing about the vertical axis in the direction in which the second transport winding member and the second relaying winding member swing, and by an amount of swing that is greater than an amount of swing of the second transport winding member and the second relaying winding member.

2. The transport conveyor as defined in claim 1, wherein each of the first transport winding member, the second transport winding member, the first relaying winding member, and the second relaying winding member is provided to be rotatable about a horizontal axis as the endless belt moves along a longitudinal direction thereof.

3. The transport conveyor as defined in claim 1, further comprising:
  a first support frame which supports the first relaying winding member and is swingable about the vertical axis;
  a second support frame which supports the second transport winding member and the second relaying winding member and is swingable about the vertical axis; and
  a base frame which supports the first transport winding member and is fixed with respect to movement about the vertical axis, and
  wherein the driving rotatable member and the transport actuator device are supported by the base frame.

4. The transport conveyor as defined in claim 1, wherein the operatively connecting mechanism includes a first operatively connecting member which operatively connects the first relaying winding member to a swing actuator device, and a second operatively connecting member which operatively connects the second transport winding member and the second relaying winding member to the swing actuator device, and
  wherein the operatively connecting mechanism is configured to cause the first operatively connecting member and the second operatively connecting member to be moved by an actuating force of the swing actuator device to cause the first relaying winding member, the second transport winding member, and the second relaying winding member to swing, in an operatively connected manner.

5. The transport unit having the transport conveyor as defined in claim 1, further comprising an adjacent conveyor located on the second direction side of, and adjacent to, the transport conveyor, and
  wherein the operatively connecting mechanism is configured to cause the adjacent conveyor, the second transport winding member, and the second relaying winding member to swing, in an operatively connected manner, to cause the adjacent conveyor, the second transport winding member, and the second relaying winding member to swing integrally about the vertical axis.

6. The transport unit as defined in claim 5, wherein the adjacent conveyor is provided to be swingable about the vertical axis,
  wherein the operatively connecting mechanism includes a first operatively connecting member which operatively connects the first relaying winding member to a swing actuator device, and a second operatively connecting member which operatively connects the second transport winding member and the second relaying winding member to the swing actuator device, a third operatively connecting member which operatively connects the adjacent conveyor to the swing actuator device, and
  wherein the operatively connecting mechanism is configured to cause the first operatively connecting member, the second operatively connecting member, and the third operatively connecting member to be moved by an actuating force of the swing actuator device, to cause the first relaying winding member, the second transport winding member, the second relaying winding member, and the adjacent conveyor to swing, in an operatively connected manner.

7. The transport unit as defined in claim 6, wherein the second transport winding member and the second relaying winding member are attached to the adjacent conveyor for swinging integrally with the adjacent conveyor about the vertical axis,
  wherein the second operatively connecting member is formed by the third operatively connecting member and the adjacent conveyor, and
  wherein the first operatively connecting member and the third operatively connecting member are provided at lower positions than the adjacent conveyor.

8. The transport unit as defined in claim 6, wherein a first support frame which supports the first relaying winding member is provided to be swingable about the vertical axis,
  wherein a second support frame which supports the second transport winding member and the second relaying winding member is connected to the adjacent conveyor for swinging integrally with the adjacent conveyor about the vertical axis,
  wherein the second operatively connecting member is formed by the third operatively connecting member and the adjacent conveyor,
  wherein, with a location at which the first operatively connecting member is connected to the first support frame being defined to be a first connecting location, and with a location at which the third operatively connecting member is connected to the adjacent conveyor being defined to be a second connecting location, the operatively connecting mechanism is configured such that the first connecting location and the second connecting location move about the vertical axis in a same direction and by a same straight line distance, as a result of a fact that the first operatively connecting member and the third operatively connecting member are moved by an actuation of the swing actuator device by a set amount, and
  wherein a relationship between a first swing radius which is a distance from the vertical axis to the first connecting location and a second swing radius which is a distance from the vertical axis to the second connecting location is set based on a relationship between an amount of swing of the first support frame and an amount of swing of the second support frame.

* * * * *